(12) United States Patent
Kiya et al.

(10) Patent No.: US 8,553,928 B2
(45) Date of Patent: Oct. 8, 2013

(54) IMAGE PROCESSING METHOD AND IMAGE INSPECTING METHOD

(75) Inventors: Hitoshi Kiya, Hino (JP); Kiyoshi Nishikawa, Hino (JP); Masaaki Fujiyoshi, Hino (JP); Yoichi Hata, Yokohama (JP); Toshiaki Kakii, Yokohama (JP); Yoshimitsu Goto, Yokohama (JP)

(73) Assignees: Sumitomo Electric Industries, Ltd., Osaka (JP); Tokyo Metropolitan University, Tokyo (JP)

( * ) Notice: Subject to any disclaimer, the term of this patent is extended or adjusted under 35 U.S.C. 154(b) by 973 days.

(21) Appl. No.: 12/529,868

(22) PCT Filed: Mar. 6, 2007

(86) PCT No.: PCT/JP2007/054317
§ 371 (c)(1),
(2), (4) Date: Dec. 8, 2009

(87) PCT Pub. No.: WO2008/107973
PCT Pub. Date: Sep. 12, 2008

(65) Prior Publication Data
US 2010/0128923 A1    May 27, 2010

(51) Int. Cl.
*G06K 9/00* (2006.01)

(52) U.S. Cl.
USPC ............................ 382/100; 382/257; 382/308

(58) Field of Classification Search
None
See application file for complete search history.

(56) References Cited

U.S. PATENT DOCUMENTS

| 6,763,122 B1 | 7/2004 | Rodriguez et al. |
| 6,813,367 B1 | 11/2004 | Bhattacharjya |
| 2007/0280551 A1* | 12/2007 | Oztan et al. ................... 382/268 |

FOREIGN PATENT DOCUMENTS

| EP | 1591958 B1 | 6/2008 |
| JP | 2001-78013 | 3/2001 |
| JP | 2003-150934 | 5/2003 |
| JP | 2006-325160 | 11/2006 |

OTHER PUBLICATIONS

Japanese Notice of Reasons for Rejection, w/ English translation thereof, issued in Japanese Patent Application No. JP 2009-502390 dated Jun. 7, 2011.
Extended European Search Report issued in European Patent Application No. 07737864.4 dated Oct. 15, 2012.
International Preliminary Report on Patentability and Written Opinion of the International Searching Authority, issued in corresponding International Patent Application No. PCT/JP2007/054317, dated Oct. 8, 2009.

* cited by examiner

*Primary Examiner* — Brian P Werner
(74) *Attorney, Agent, or Firm* — McDermott Will & Emery LLP

(57) ABSTRACT

The present invention relates to an image processing method and image inspecting method with high versatility which enable efficient and highly accurate proof of authenticity of a digital image. The image processing method subjects at least a part of a digital image which can exist temporarily or continuously in a falsification-vulnerable environment, to a first morphology operation using a predetermined structuring element, to process the digital image. The image inspecting method subjects the digital image thus processed, to a second morphology operation using the same structuring element as in the first morphology operation. The morphology operations have the idempotent and the presence or absence of falsification can be detected by determining identity of images before and after the second morphology operation.

9 Claims, 13 Drawing Sheets

Fig.3
(a)
(b)
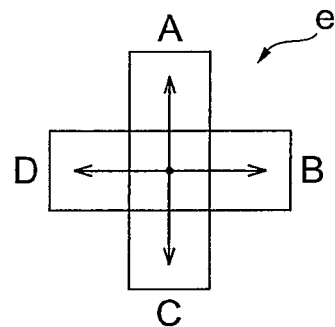
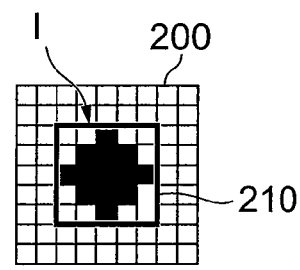
(c)
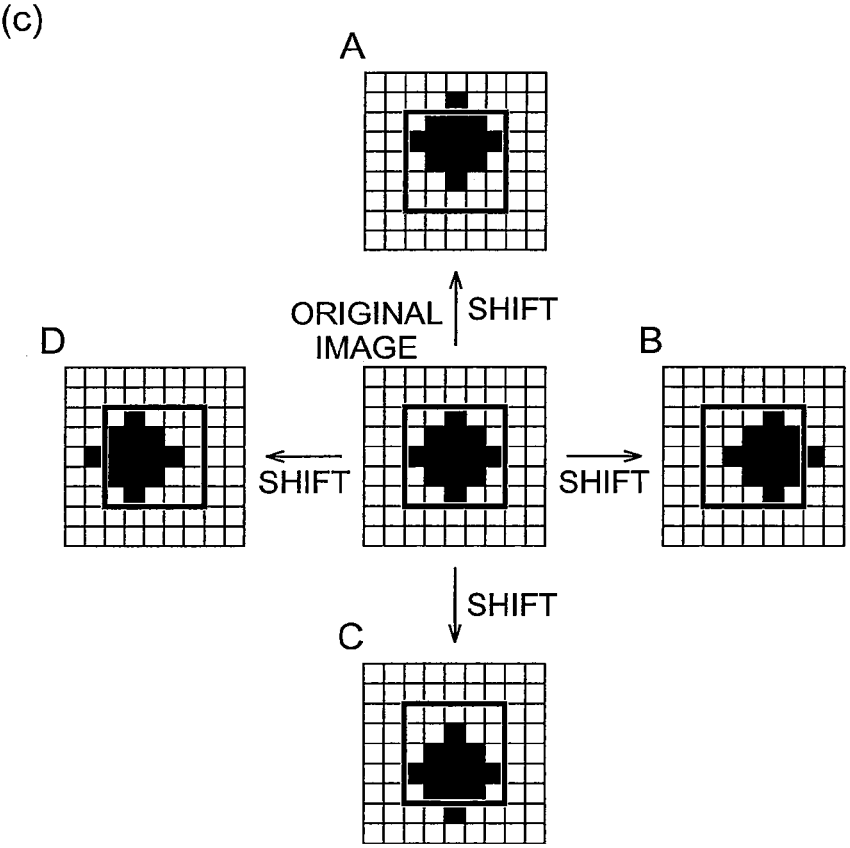

IMAGE PROCESSING METHOD AND IMAGE INSPECTING METHOD

RELATED APPLICATIONS

This application is the U.S. National Phase under 35 U.S.C. §371 of International Application No. PCT/JP2007/054317, filed on Mar. 6, 2007, the disclosure of which Application is incorporated by reference herein.

TECHNICAL FIELD

The present invention relates to information security technology for proving authenticity of a digital image and, more particularly, to an image processing method and image inspecting method for enabling detection of whether the digital image is falsified, identification of a falsified portion in the digital image, and insertion of electronic watermark information in the digital image.

BACKGROUND ART

The recent performance upgrade of computers and networks continues to increase distribution of digital contents composed of image data such as still images or videos, audio data, and so on. Particularly, since it is easy to edit the digital image, unauthorized falsification has been recognized as a social problem. Under such circumstances, attention has been drawn to the electronic watermark technology of embedding specific information in multimedia data such as images and audio, with little effect on a total information amount of data (cf. Patent Document 1).

The electronic watermark technology can prevent unauthorized copy and data falsification and also permits embedding of right management information such as a notice of copyright, as well as the fact of data falsification. The electronic watermark technology employs a variety of processing methods depending upon objects for embedding of watermark information in an original image (digital image) and an example thereof will be described as to a case of a still image, using FIG. 1. FIG. 1 is a conceptual diagram for explaining a general application example of the electronic watermark technology to a digital image.

First, an original image I (still image) is subjected to frequency transformation by Fourier transform and the resultant transformed data is manipulated with "key" information such as an embedded position or intensity to insert pulsed watermark information S in the transformed data. Then the transformed data with the watermark information S therein is subjected to inverse Fourier transform to obtain an image $I_S$ in which the watermark information S is embedded. Since the watermark information S is spread over the entire image in the process of inverse Fourier transform, the resultant image $I_S$ and the original image I are apparently indistinguishable.

On the other hand, the resultant image $I_S$ will exist in a falsification-vulnerable environment 100. Specifically, it will be distributed through a network 101 to third parties and recorded and stored in a recording device 102 such as a hard disk (including recording media such as CD and DVD distributed in the market). For detecting falsification of an image $I'_S$ having existed in the falsification-vulnerable environment 100, electronic watermark information S' embedded therein is extracted from the acquired image $I'_S$ by dedicated software and this extracted watermark information S' is compared with the watermark information S previously embedded, so as to permit a determination to be made on whether falsification is made in fact in the convertible environment 100.

Patent Document 1: Japanese Patent Application Laid-open No. 2000-341632

DISCLOSURE OF THE INVENTION

Problems that the Invention is to Solve

The inventors have studied the conventional information security technology, particularly, the electronic watermark technology and found the problems as described below. Namely, the conventional electronic watermark technology allows the watermark information to be embedded in an apparently indistinguishable manner in the original image and thus enables confirmation of authenticity of the original image with little reduction in the information amount itself. On the other hand, the conventional electronic watermark technology is to apply different processing methods depending upon types of images as objects and thus has low versatility; therefore, it is not widespread. Furthermore, it is unable to specifically identify a falsified portion. Since a huge computation amount was needed for embedment and extraction of watermark information, it was difficult to apply the conventional electronic watermark technology to cases where high-speed processing was required, e.g., a case where an object was each of frame images constituting dynamic image data. Furthermore, the conventional electronic watermark technology involved complicated luminance adjustment and image quality adjustment and thus had a problem that it was infeasible to perform flexible adjustment of these luminance and image quality.

The present invention has been accomplished in order to solve the problems as described above and an object of the invention is to provide a highly versatile image processing method and image inspecting method for permitting detection of whether a digital image is falsified, and specific identification of a falsified portion and enabling efficient and highly accurate insertion of electronic watermark information in the digital image, as an authenticity proving technology of digital image.

Means for Solving the Problems

An image processing method and image inspecting method according to the present invention are to apply Idempotent of Morphology Operation to the information security technology to prove the authenticity of a digital image, thereby achieving an effect either equaling or surpassing the conventional electronic watermark technology while requiring a smaller calculation amount (or realizing a higher speed). The idempotent of morphology operation herein refers to such a property that, in a situation where a morphology image $I_f$ is obtained by carrying out a morphology operation f using a structuring element e on an original image I and where the morphology operation f using the same structuring element e is again carried out (to obtain a morphology image $I_{ff}$), identity ($I_f=I_{ff}$) is maintained between the images before and after the operation.

In order to achieve the above object, an image processing method according to the present invention is applied to an object of a digital image that can exist temporarily or continuously in a falsification-vulnerable environment and is configured to perform processing for proving the authenticity of the digital image to enable detection of whether the digital image is falsified, specific identification of a falsified portion, and insertion of electronic watermark information in the digital image. The falsification-vulnerable environment includes a recording device such as a hard disk to store digital contents (including recording media such as CD and DVD distributed in the market) and also includes a network space in which data is frequently transmitted and received. The digital image as an object to be processed includes a still image and each of frame images forming a dynamic picture and further includes imaged papers and documents, and binarized images thereof.

A first embodiment of the image processing method according to the present invention comprises at least a first extraction step, a first operation step, and a first generation step.

The first extraction step is to extract from an unprocessed digital image, at least a part of the unprocessed digital image as processing object information. In this case, the first extraction step may extract the entire unprocessed digital image as the processing object information or may extract a part of image components forming the unprocessed digital image, or a region of the unprocessed digital image as the processing object information. The first operation step is to subject the extracted processing object information to a first morphology operation using a predetermined first structuring element e, to obtain first morphology image information. The first generation step is to generate a processed digital image containing the first morphology image information obtained.

This image processing method of the first embodiment has four degrees of freedom, (1) type of the morphology operation, (2) shape and size of the structuring element, (3) bit-plane depth to which the morphology operation is applied, and (4) image region to which the morphology operation is applied, and offers optional change in image quality, falsification detection capability, and falsification position identification accuracy through adjustment of them. The "unprocessed digital image" in the present specification simply means a digital image as an object of the morphology operation and, therefore, a processed digital image already subjected to a morphology operation can also be an object of the second or subsequent morphology operation as an unprocessed digital image. An effect of subjecting a single digital image to two or more morphology operations is as follows. With a single morphology operation, how to determine the structuring element is limited and the resultant digital image becomes readily decipherable (if it is deciphered the original digital image can be readily falsified or modified). When a single digital image as an object is subjected to two or more morphology operations, a combination of structuring elements as "keys" becomes synergistically complicated, so as to drastically improve the level of information security.

When a component (frequency component, color component, luminance component, or bit plane) of the unprocessed digital image is extracted as the processing object information, the first extraction step can extract as the processing object component at least one of a plurality of image components resulting from component decomposition of the unprocessed digital image, as to one of frequency components, color components, luminance components, and bit planes of the unprocessed digital image. The first extraction step can also extract as a processing object image one or more images (partial images) of a specific shape (a rectangular shape, a graphic showing a character or mark, or a shape such as a bar code) from the unprocessed digital images. In this case, the morphology operation is carried out on the partial image. Particularly, in a case where each of the partial images is a pattern showing a visually recognizable character or significant shape and where the partial images constitute a significant character string or mark, it is possible to embed significant information (an electronic signature composed of partial images) in the digital image.

The "extraction" in the present specification includes all of (1) a process to separate a part of a digital image as an object of the morphology operation from the digital image (clipping process of clipping a partial image from the digital image), (2) a process to copy each region in a digital image as a partial image becoming an object of the morphology operation (copying process), and (3) a process to specify each region in a digital image as an object region of the morphology operation (partial process of defining the digital image itself as an object of the morphology operation and subjecting each of specified regions partially to the morphology operation).

In the above configuration, if the structuring element e applied to the morphology operation is too large, the image $I_f$ after the operation will fail to adequately preserve the details of the original image I. For this reason, the image quality of the image $I_f$ after the operation can degrade significantly. Then a second embodiment of the image processing method according to the present invention further comprises a second operation step of subjecting difference information between the processing object information extracted in the first extraction step and the first morphology image information obtained in the first operation step, to a second morphology operation using a second structuring element $e_S$ ($e_S \subset e$: structuring element forming a part of the first structuring element and being smaller than the first structuring element) different from the first structuring element e, to obtain first morphology difference information. In this case, the first generation step is to perform a logical subtraction operation between the first morphology image information obtained in the first operation step and the first morphology difference information obtained in the second operation step, to generate the processed digital image. The morphology operation falls into two types, opening and closing, depending upon difference in processing order as described below. In the present specification the logical subtraction operation means an operation to obtain a difference image $I_P$ from two types of images I, $I_d$. Specifically, when the morphology operation is opening, the difference image $I_P$ is given by I+$I_d$. On the other hand, when the morphology operation is closing, the difference image $I_P$ is given by I-$I_d$. This second embodiment permits the details of the original image I to be preserved even if the structuring element becomes large, while ensuring four degrees of freedom as in the aforementioned first embodiment. In this second embodiment, the processed digital image already subjected to the morphology operation may be again an unprocessed digital image as an object of the morphology operation (i.e., two or more morphology operations may be carried out on an object of a single digital image).

The image processing method of the second embodiment further comprises the second operation step in addition to the first extraction step, the first operation step, and the first generation step, and the first extraction step may extract the entire unprocessed digital image as the processing object information or extract a part of an image component forming the unprocessed digital image or a region of the unprocessed digital image as the processing object information, as described above. Specifically, when a part of the unprocessed digital image is extracted as the processing object information, the first extraction step may extract as a processing object component at least one of a plurality of image components resulting from component decomposition of the unprocessed digital image, as to one of frequency components, color components, luminance components, and bit planes of the unprocessed digital image. The first extraction step may extract as a processing object image one or more partial images of a specific shape forming a part of the unprocessed digital image, from the unprocessed digital image, for the purpose of increasing the speed of the image processing method. In this second embodiment, the "extraction" process with the unprocessed digital image includes all of (1) clipping process, (2) copying process, and (3) partial process as described above.

In the image processing method according to the present invention, in a case where a binarized image is subjected to the morphology operation and where the background is a single color (e.g., white), it is sometimes the case that the falsification detection capability and falsification position identification accuracy after the morphology operation are insufficient. In the image processing method according to the present invention, therefore, the first extraction step may preliminarily superimpose a background image on a digital image (original image) of a processing object to obtain the unprocessed digital image (combining process), in order to achieve further improvement in the falsification detection capability and falsification position identification accuracy.

On the other hand, a first embodiment of the image inspecting method according to the present invention is to inspect authenticity of a digital image, e.g., detect whether the digital image is falsified or identify a falsified portion therein, for the digital image having been subjected to the processing for proof of authenticity by the image processing method having the above-described structure (the image processing method according to the present invention). Specifically, the image inspecting method of the first embodiment comprises at least a second extraction step, a third operation step, a second generation step, and a determination step.

Namely, the second extraction step is to extract from an acquired digital image (digital image acquired from a falsification-vulnerable environment), at least a part of the acquired digital image as inspection object information. The third operation step is to subject the extracted inspection object information to a third morphology operation using a third structuring element e which is the same as the first structuring element applied in the aforementioned image processing, to obtain second morphology image information. The second generation step is to generate a digital image for inspection containing the second morphology image information. The determination step is to determine whether the acquired digital image is falsified, based on difference information between the generated digital image for inspection and the acquired digital image. Namely, without falsification, identity is maintained between the extracted digital image for inspection and the acquired digital image because of the idempotent of morphology operation; therefore, the value of the resultant difference information is zero for each pixel. On the contrary, if there is a pixel with a nonzero value, a position of the pixel with the nonzero value is detected as a falsification position.

In the image inspecting method of this first embodiment, in the case where the morphology operation is carried out on one component (frequency component, color component, luminance component, or bit plane) of the unprocessed digital image in the aforementioned image processing method, the second extraction step may also extract as a processing object component at least one of a plurality of image components resulting from component decomposition of the acquired digital image, as to one of frequency components, color components, luminance components, and bit planes of the acquired digital image. In the case where in the aforementioned image processing method the morphology operation is carried out on one or more partial images extracted from the unprocessed digital image, the second extraction step is to extract the whole of the acquired digital image as a processing object image. In this case, since the entire acquired digital image is subjected to the morphology operation, identity of image regions corresponding to partial images subjected to at least two morphology operations is maintained because of the idempotent of morphology operation, while for the remaining image region, identity cannot be maintained before and after the morphology operation in the falsification detection. By generating a difference image between the acquired digital images before and after the morphology operation, it becomes feasible to read information embedded in the acquired digital image (an electronic signature such as a significant character string composed of partial images extracted in image processing) (and to visually recognize it).

Furthermore, in the case where in the image processing method of the second embodiment the difference information between the original image information of the unprocessed digital image and the morphology image information is further subjected to the morphology operation to preserve the details of the original image (the image processing method of the second embodiment), the second embodiment of the image inspecting method according to the present invention further comprises a fourth operation step in addition to the second extraction step, the third operation step, and the determination step. This image inspecting method of the second embodiment does not require the aforementioned second generation step because the finally obtained morphology difference information becomes determination data for inspection of authenticity (e.g., detection of the presence or absence of falsification). Without any falsification, all the pixel values of the extracted difference information should be zero because of the idempotent of morphology operation and in this case, the determination step results in determining that no falsification was made in the acquired digital image. On the contrary, if there is a pixel with a nonzero value, a position of the pixel with the nonzero value is detected as a falsification position.

In the image inspecting method of the second embodiment, the second extraction step is to extract from an acquired digital image, at least a part of the acquired digital image as inspection object information. The third operation step is to subject the extracted inspection object information to a third morphology operation using a third structuring element e which is the same as the first structuring element applied in the aforementioned image processing method, to obtain second morphology image information. The fourth operation step is to subject difference information between the extracted inspection object information and the second morphology image information obtained in the third operation step, to a fourth morphology operation using a fourth structuring element $e_S$ ($e_S \subset e$) which is the same as the second structuring element applied in the aforementioned image processing method, to obtain second morphology difference information. The determination step is to detect whether the acquired digital image is falsified or to specify a falsified portion therein, based on the obtained second morphology difference information.

In the case where in the aforementioned image processing method the morphology operation is carried out on one component (frequency component, color component, luminance component, or bit plane) of the unprocessed digital image, the image inspecting method of the second embodiment comprises the second extraction step to extract as the inspection object information at least one of a plurality of image components resulting from component decomposition of the acquired digital image into components, as to one of frequency components, color components, luminance components, and bit planes of the acquired digital image. In the case where in the aforementioned image processing method the morphology operation is carried out on one or more partial images extracted from the unprocessed digital image, the second extraction step is to extract a partial image forming a part of the acquired digital image, as an inspection object image, for the purpose of increasing the speed of the image inspecting method.

In the image inspecting methods of the first and second embodiments described above, the "extraction" process with the acquired digital image also includes all of (1) clipping process, (2) copying process, and (3) partial process as described above.

The image processing methods and image inspecting methods according to the present invention may be a program executed in a computer or the like and in this case, the program may be distributed through a wired or wireless network, or may be stored in a recording medium such as a CD, DVD, or flash memory managed in a server or a terminal device.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will be apparent to those skilled in the art from this detailed description.

Effects of the Invention

Since the image processing methods and image inspecting methods according to the present invention are configured to prove the authenticity of the digital image by making use of the idempotent of morphology operation, high versatility is realized and it becomes feasible to prove the authenticity of the digital image at higher speed and with higher accuracy, when compared with the conventional electronic watermark technology. For example, the image processing methods and image inspecting methods permit right management information such as a notice of copyright to be embedded as an electronic watermark in a digital image, and to be extracted from the digital image.

BRIEF DESCRIPTION OF THE DRAWINGS

FIG. 3 is a conceptual diagram (No. 1) for explaining the principle of the morphology operation applied to the image processing methods and image inspecting methods according to the present invention;

DESCRIPTION OF THE REFERENCE NUMERALS

I: original image (unprocessed digital image); $I_f$: morphology image; 100: falsification-vulnerable environment; 101: network; 102: recording device; 200: virtual image space; and 210: original image frame.

BEST MODES FOR CARRYING OUT THE INVENTION

Each of the embodiments of the processing method of a digital image and image inspecting method according to the present invention will be described below in detail with reference to FIGS. 2 to 13. In the description of the drawings identical portions and identical elements will be denoted by the same reference symbols, without redundant description.

Figure 1:
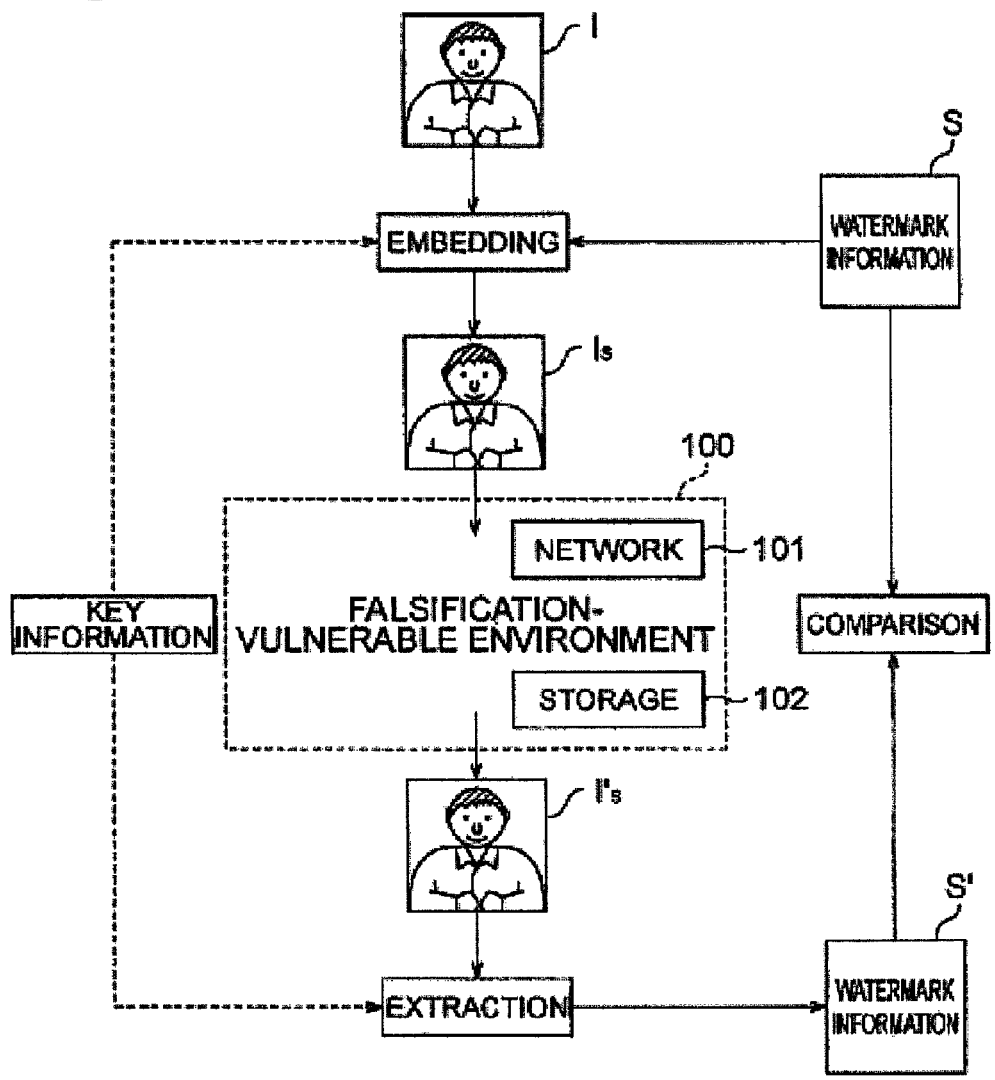
FIG. 1 is a conceptual diagram for explaining a general application example of the electronic watermark technology to a digital image.
Figure 2:
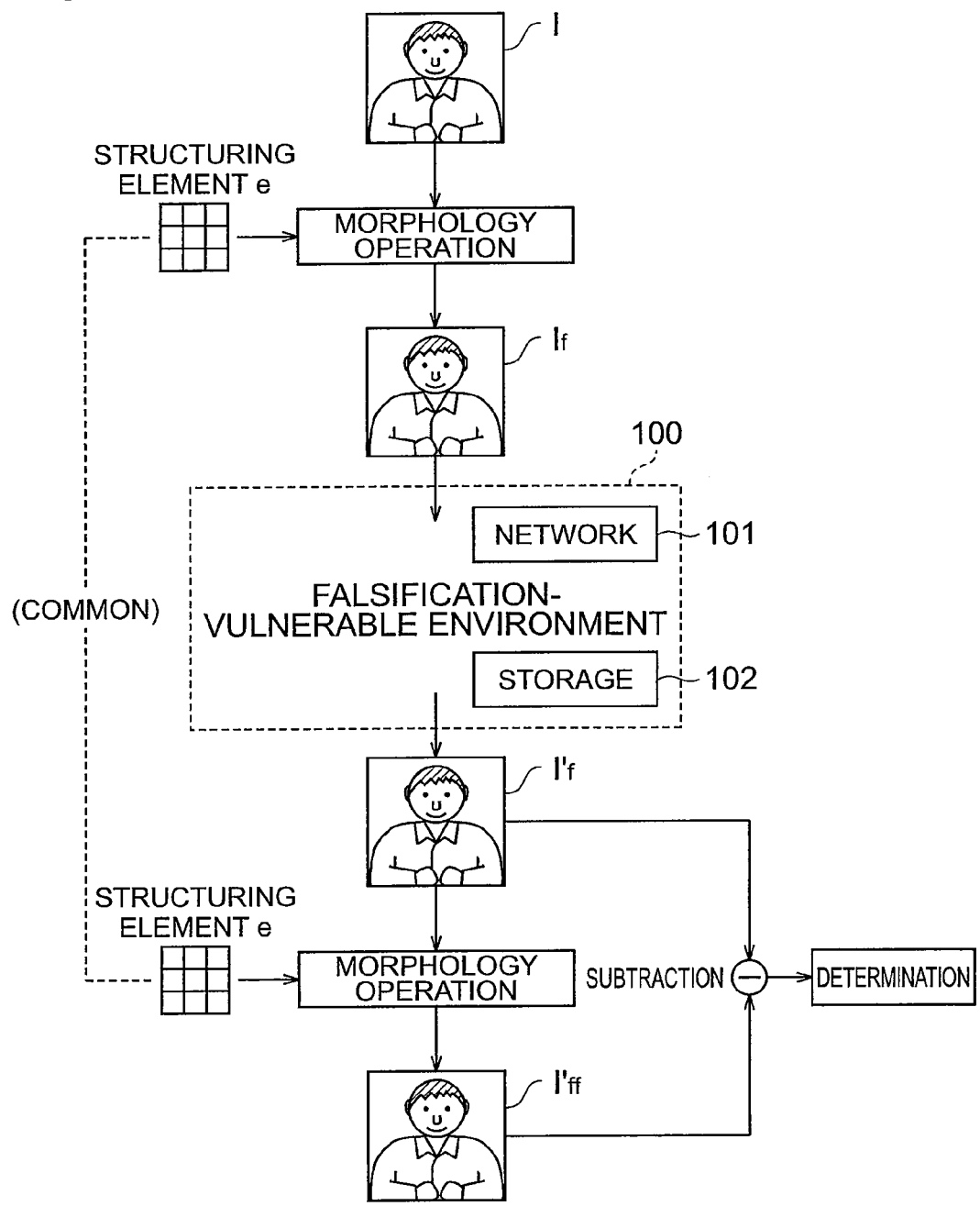
FIG. 2 is a conceptual diagram for explaining the first embodiment of the image processing method and image inspecting method according to the present invention.

FIG. 2 is a conceptual diagram for explaining the first embodiment of the image processing method and image inspecting method according to the present invention. The image processing method of the first embodiment has at least an extraction step (extraction step for processing), an operation step (first operation step for processing), and a generation step (generation step for processing) and is to generate a digital image to be provided in a falsification-vulnerable environment 100 including a network 101 and a recording device 102, as shown in FIG. 2.

Specifically, in the image processing method of the first embodiment, the extraction step for processing is to extract from an unprocessed digital image I (original image information), at least a part of the unprocessed digital image I as processing object information. The first operation step for processing is to subject the extracted processing object information to a morphology operation using a predetermined structuring element e to obtain morphology image information. The generation step for processing is to generate a processed digital image $I_f$ containing the morphology image information obtained. In FIG. 2, the extraction step for processing is to extract the whole of the unprocessed digital image I as the processing object information and the generation step for processing is to generate as the processed digital image $I_f$ the morphology image information obtained in the first operation step for processing, as it is.

On the other hand, the image inspecting method of the first embodiment has an extraction step (extraction step for detection), an operation step (first operation step for detection), generation step (generation step for detection), and a determination step, for proving the authenticity of a digital image $I'_f$ (acquired digital image) acquired from the falsification-vulnerable environment 100 (or for detecting whether it is falsified).

In the image inspecting method of the first embodiment, specifically, the extraction step for detection is to extract from the acquired digital image $I'_f$, at least a part of the acquired digital image $I'_f$ as detection object information. The first operation step for detection is to subject the extracted inspection object information again to a morphology operation using a structuring element e (which is the same as the structuring element applied in the aforementioned image processing), to obtain morphology image information. The generation step for detection is to generate a digital image $I'_{ff}$ for inspection containing the second morphology image information obtained in the first operation step for detection. The determination step is to determine whether there is falsification in the acquired digital image $I'_f$ in the falsification-vulnerable environment 100, based on difference information between the digital image $I'_{ff}$ for inspection thus generated and the acquired digital image $I'_f$. If there is no falsification in the acquired digital image $I'_f$, identity is maintained between the digital image $I'_{ff}$ for inspection generated and the acquired digital image $I'_f$ and thus the value of the difference information obtained is zero for each pixel. On the contrary, if there is a pixel with a nonzero value, a position of the pixel with the nonzero value is detected as a falsification position.

In FIG. 2, the extraction step for detection is to extract the whole of the acquired digital image $I'_f$ as the processing object information and the generation step for detection is to generate as the digital image $I'_{ff}$ for detection the morphology image information obtained in the first operation step for detection, as it is. A single digital image may be subjected to two or more morphology operations. Furthermore, the type of the morphology operation, the shape and size of the structuring element, the bit-plane depth to which the morphology operation is applied, and the image region to which the morphology operation is applied are appropriately adjusted in order to achieve desired image quality, falsification detection capability, and falsification position identification accuracy.

The below will detail the principle of the morphology operation applied to the image processing methods and image inspecting methods according to the present invention, with reference to FIGS. 3 and 4.

The morphology operation f is comprised of an element to move an image, called Structuring Element e, and operations called Minkowski addition and Minkowski subtraction. Namely, the morphology operation is carried out by a combination of Erosion to perform the Minkowski addition and Dilation to perform the Minkowski subtraction; particularly, the morphology operation executed in the order of erosion and dilation is referred to as Opening, and the morphology operation executed in the order of dilation and erosion as Closing. It is confirmed that idempotent of opening and idempotent of closing both are maintained, and thus either of opening and closing may be carried out as the morphology operation. The idempotent is such a property of the morphology operation that, where a morphology image $I_f$ is obtained by execution of the morphology operation f using the structuring element e on the original image I and where the morphology operation f using the same structuring element e is again carried out (to obtain a morphology image $I_{ff}$), identity ($I_f=I_{ff}$) is maintained between images before and after the operation.

For example, let us explain a case where the structuring element shown in the area (a) of FIG. 3 is applied as the structuring element e. The structuring element e shown in the area (a) of FIG. 3 is a structuring element to move the original image I in directions of A-D with respect to the original image I as a center. The area (b) of FIG. 3 shows the original image I and in the area (b), reference numeral 200 denotes a virtual image space and a solid line of 210 represents an original image frame.

When the original image I (area (b) of FIG. 3) is subjected to the morphology operation (which may be either of opening and closing) using the structuring element e (area (a) of FIG. 3), the first step is to obtain shift images A-D resulting from movement of the original image I in the directions designated by the structuring element e, in the virtual image space 200 (area (c) of FIG. 3).

Figure 4:
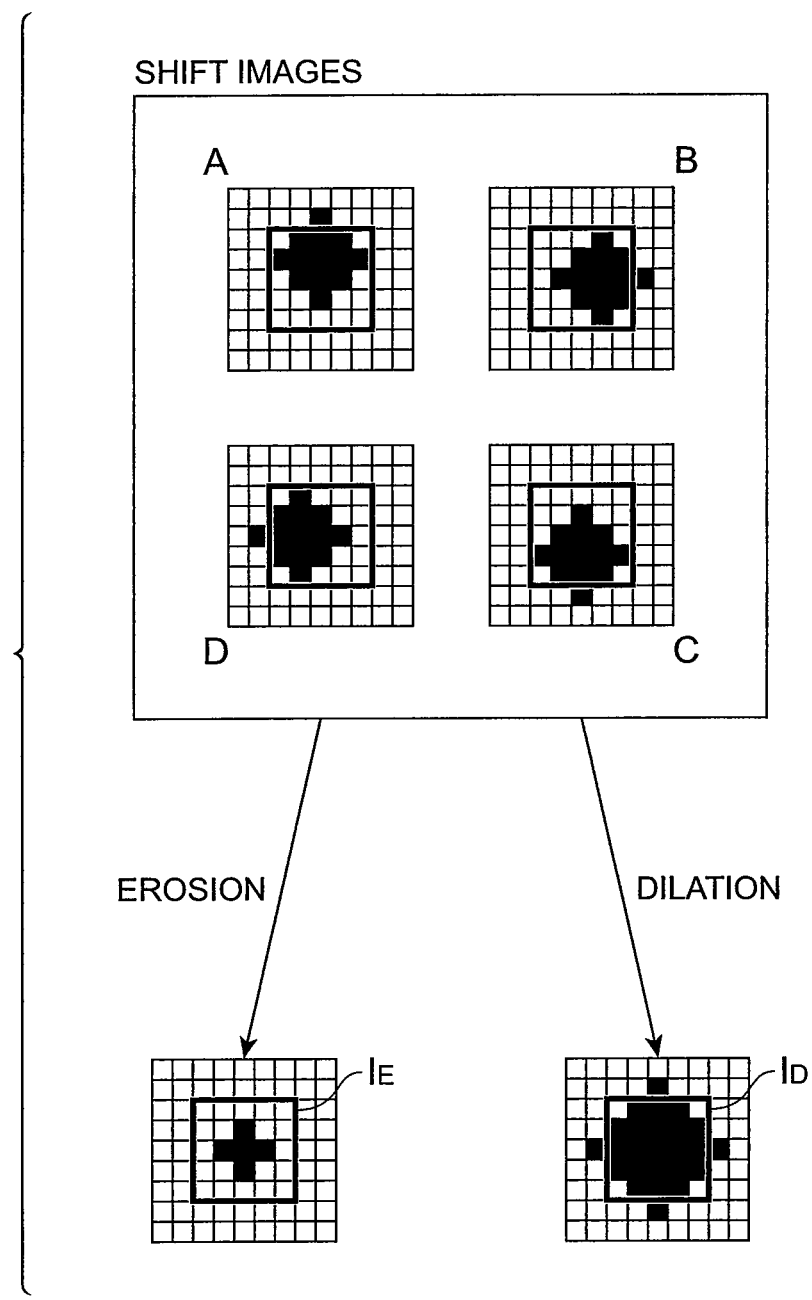
FIG. 4 is a conceptual diagram (No. 2) for explaining the principle of the morphology operation applied to the image processing methods and image inspecting methods according to the present invention.

FIG. 4 shows a conceptual diagram of an image generation step by the erosion process and the dilation process. Namely, an erosion image $I_E$ is obtained by performing the Minkowski subtraction of the shift images A-D obtained in this manner (erosion). On the other hand, a dilation image $I_D$ is obtained by performing the Minkowski addition of the shift images A-D (dilation). When opening is carried out as the morphology operation on the original image, the original image is moved in the directions designated by the structuring element in the virtual image space to obtain a plurality of shift images and these shift images are subjected to erosion and thereafter to dilation. When closing is carried out on the original image, the plurality of shift images obtained using the structuring element e are subjected to dilation and thereafter to erosion.

The below will describe application examples of the image processing method and image inspecting method according to the first embodiment, with reference to FIGS. 5 to 9. The image processing method of the first embodiment shown in FIG. 2 is configured to subject the whole of the unprocessed digital image I (original image information) to the morphology operation, whereas in the application examples described below, the morphology operation is carried out on one component of the unprocessed digital image I or on a partial image clipped from the unprocessed digital image I.

Figure 5:
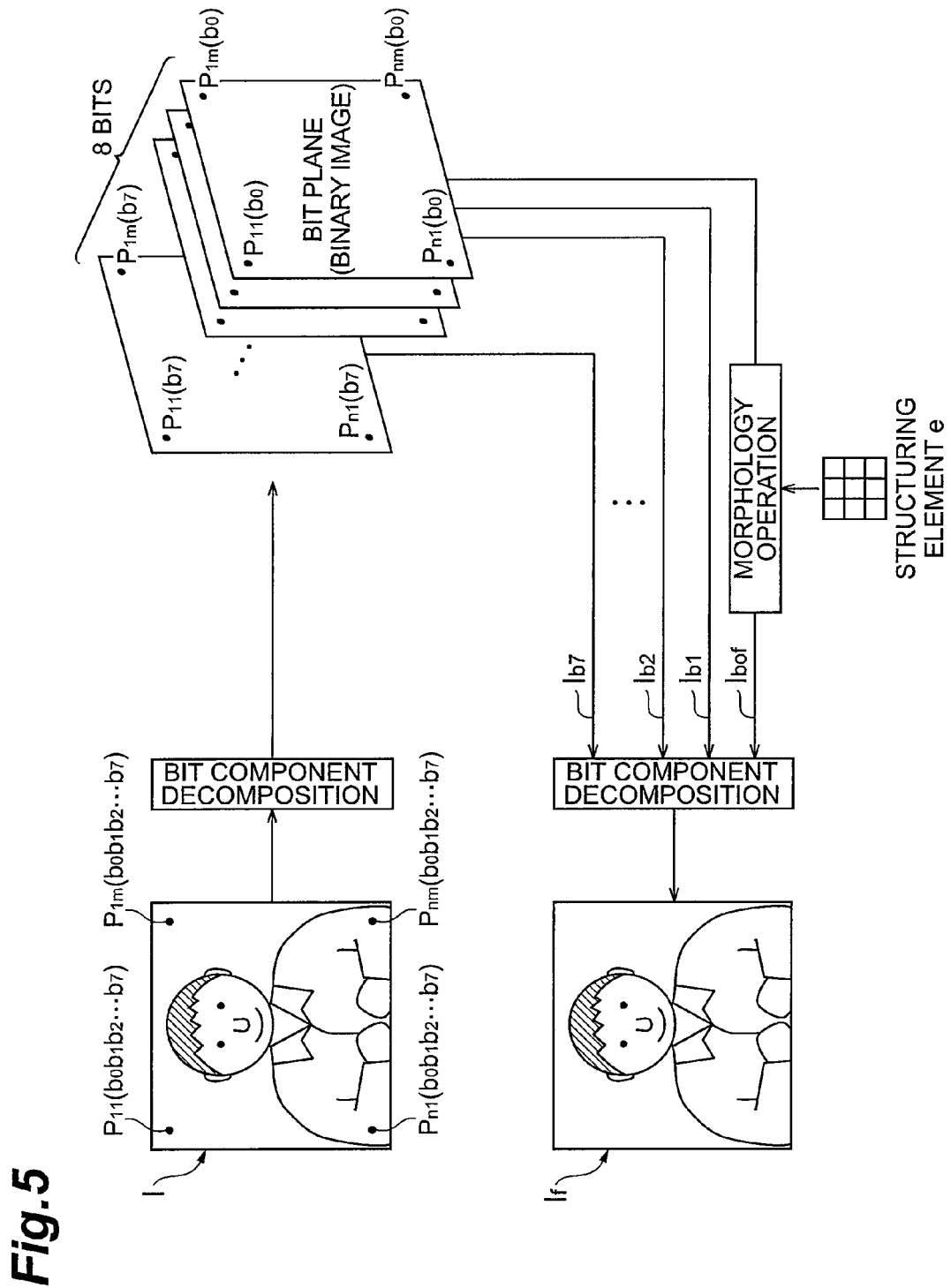
FIG. 5 is a conceptual diagram for explaining a first application example (bit component decomposition) of the image processing method according to the first embodiment.

First, FIG. 5 is a drawing for explaining the first application example (bit component decomposition) of the image processing method according to the first embodiment. The unprocessed digital image I shown in FIG. 5 is composed of pixels each containing information of multiple bits (e.g., 8 bits) ($P_{11}(b_0, b_1, b_2, \ldots, b_7), P_{12}(b_0, b_1, b_2, \ldots, b_7), \ldots$, and $P_{nm}(b_0, b_1, b_2, \ldots, b_7)$). The image processing method of this first application example has an extraction step for processing, a first operation step for processing, and a generation step for processing.

The extraction step for processing is to carry out the bit component decomposition of the unprocessed digital image I to obtain a bit plane $I_{b0}$ composed of the first bits of the respective pixels $P_{11}, P_{12}, \ldots, P_{nm}$, a bit plane $I_{b1}$ composed of the second bits of the respective pixels $P_{11}, P_{12}, \ldots, P_{nm}, \ldots$, and a bit plane $I_{b7}$ composed of the eighth bits of the respective pixels $P_{11}, P_{12}, \ldots, P_{nm}$, and to extract one of these bit planes (in FIG. 5, the bit plane $I_{b0}$) as a processing object plane. The first operation step for processing is to subject the extracted processing object plane $I_{b0}$ to the morphology operation using the structuring element e, to obtain morphology image information. The generation step for processing is to perform bit component composition to combine the bit plane $I_{b0}$ as the processing object plane (the morphology image information obtained in the first operation step for processing) with the remaining bit planes $I_{b1}$-$I_{b7}$ to generate a morphology image $I_f$ as a processed digital image.

On the other hand, the image inspecting method (image inspecting method according to the first application example) corresponding to the image processing method of the first application example has an extraction step for detection, a first operation step for detection, a generation step for detection, and a determination step. In the image inspecting method of the first application example, the extraction step for detection is to perform bit component decomposition to decompose a digital image $I'_f$ (acquired digital image) acquired from the falsification-vulnerable environment 100, into bit planes $I_{b0}$–$I_{b7}$ as described above, and to extract a bit plane $I_{b0}$, which was extracted as the processing object plane, as inspection object information from the obtained bit planes. The first operation step for detection is to subject the bit plane $I_{b0}$, which was extracted as the inspection object information, to the morphology operation using the structuring element e (which is the same as the structuring element applied in the image processing method of the first application example). The generation step for detection is to perform bit plane composition to combine the bit plane $I_{b0}$ as the inspection object information (the morphology image information obtained in the first operation step for detection) with the remaining bit planes (bit plane $I_{b1}$-bit plane $I_{b7}$) except for the inspection object component out of the plurality of bit planes resulting from the bit component decomposition in the extraction step for detection, to generate a digital image $I'_{ff}$ for inspection. Then the determination step is to detect whether the acquired digital image $I'_f$ is falsified or to specify a falsified portion therein, based on difference information between the digital image $I'_{ff}$ for inspection thus generated and the acquired digital image $I'_f$.

Figure 6:
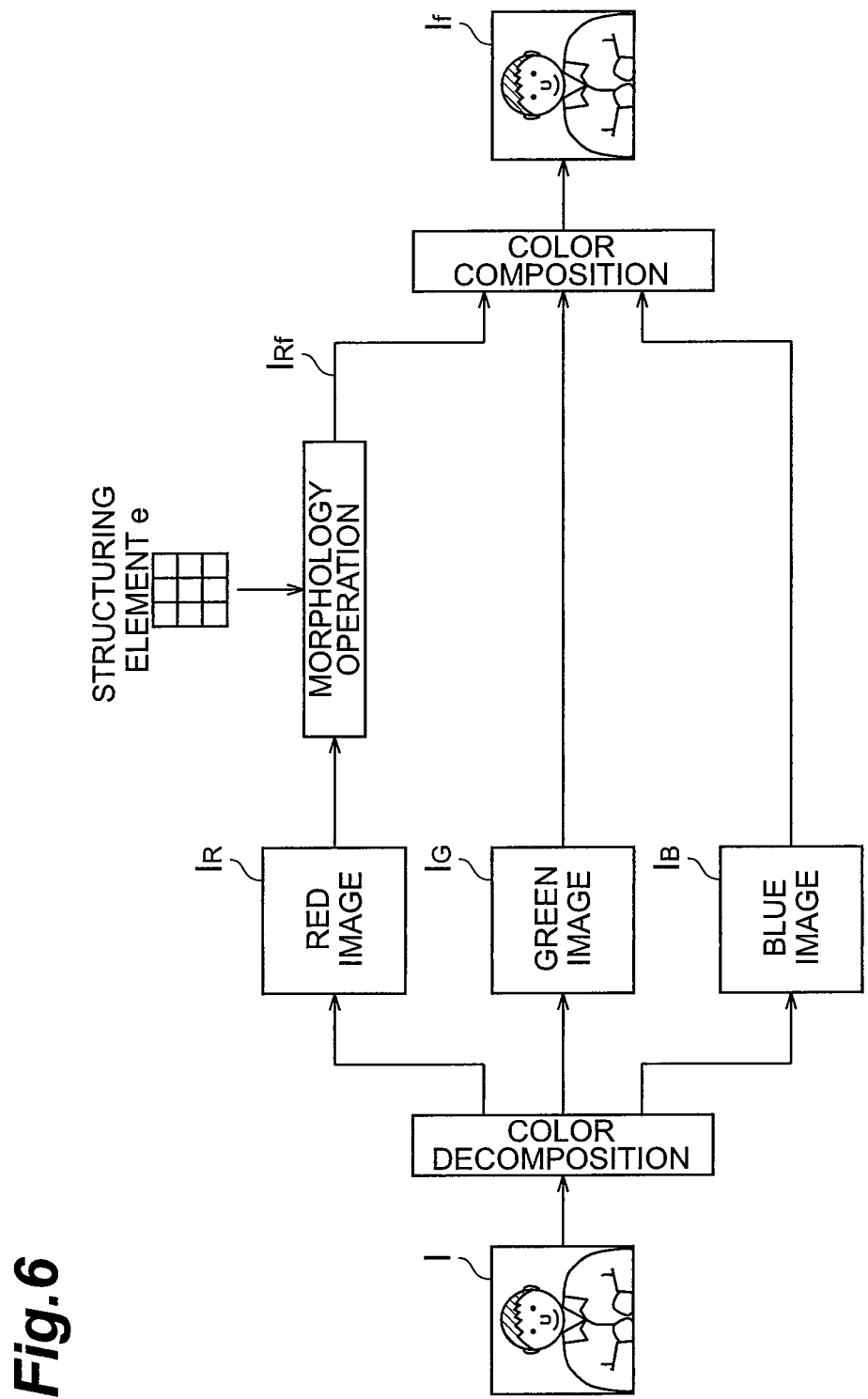
FIG. 6 is a conceptual diagram for explaining a second application example (color decomposition) of the image processing method according to the first embodiment.

FIG. 6 is a drawing for explaining the second application example (color decomposition) of the image processing method according to the first embodiment. The image processing method of the second application example also has an extraction step for processing, a first operation step for processing, and a generation step for processing.

In the image processing method of the second application example, the extraction step for processing is to extract as a processing object component at least one (in FIG. 6, a red image component $I_R$) out of a plurality of color image components (red image component $I_R$, green image component $I_G$, and blue image component $I_B$) obtained by color decomposition of the unprocessed digital image I. The first operation step for processing is to subject the extracted processing object component (red image component $I_R$) to the morphology operation. The generation step for processing is to perform color composition to combine the processing object component (red image component $I_R$) subjected to the morphology operation in the first operation step for detection, with the remaining color image components (green image component $I_G$ and blue image component $I_B$) except for the processing object component out of the plurality of color image components resulting from the color decomposition in the extraction step for detection, to obtain the processed digital image $I_f$.

On the other hand, the falsification detection (image inspecting method of the second application example) corresponding to the image processing method of the second application example has an extraction step for detection, a first operation step for detection, a generation step for detection, and a determination step. The extraction step for detection is to perform color decomposition to decompose the digital image $I'_f$ (acquired digital image) acquired from the falsification-vulnerable environment 100, into red image component $I_R$, green image component $I_G$, and blue image component $I_B$ and to extract as inspection object information at least one (in FIG. 6, red image component $I_R$) of the resultant color image components. The first operation step for detection is to subject the extracted inspection object information (red image component $I_R$) to the morphology operation using the structuring element e (which is the same as the structuring element applied in the image processing method of the second application example). The generation step for detection is to perform color composition to combine the red image component $I_R$ as the detection object information (the morphology image information obtained in the first operation step for detection) with the remaining color image components (green image component $I_G$ and blue image component $I_B$) except for the inspection object component out of the plurality of color image components resulting from the color decomposition in the extraction step for detection, to generate a digital image $I'_{ff}$ for inspection. The determination step is to detect whether the acquired digital image $I'_f$ is falsified or to specify a falsified portion therein, based on difference information between the digital image $I'_{ff}$ for inspection thus generated and the acquired digital image $I'_f$.

Figure 7:
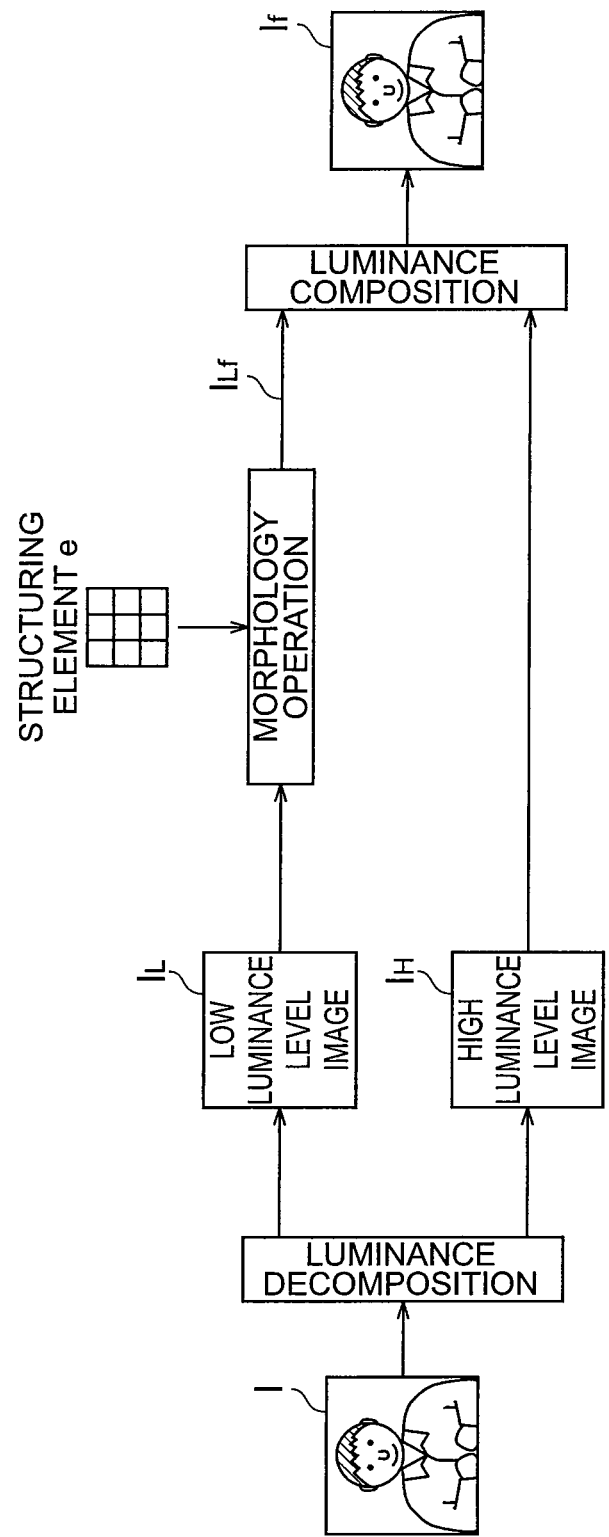
FIG. 7 is a conceptual diagram for explaining a third application example (luminance decomposition) of the image processing method according to the first embodiment.

FIG. 7 is a drawing for explaining the third application example (luminance decomposition) of the image processing method according to the first embodiment. The image processing method of the third application example also has an extraction step for processing, a first operation step for processing, and a generation step for processing.

In the image processing method of the third application example, the extraction step for processing is to extract as a processing object component at least one (in FIG. 7, low luminance level image $I_L$) out of a plurality of luminance image components (low luminance level image $I_L$ and high luminance level image $I_H$ obtained by component decomposition of the unprocessed digital image I into luminance levels. The first operation step for processing is to subject the extracted processing object component (low luminance level image $I_L$) to the morphology operation. The generation step for processing is to perform component composition to combine the processing object component (low luminance level image $I_L$) subjected to the morphology operation in the first operation step for processing, with the remaining luminance image components (low luminance level image $I_L$) except for the processing object component out of the plurality of luminance image components resulting from the component decomposition in the extraction step for processing, to obtain the processed digital image $I_f$.

On the other hand, falsification detection (image inspecting method of the third application example) corresponding to the image processing method of the third application example has an extraction step for detection, a first operation step for detection, a generation step for detection, and a determination step. The extraction step for detection is to perform component decomposition of the digital image $I'_f$ (acquired digital image) acquired from the falsification-vulnerable environment 100, into low luminance level image $I_L$ and high luminance level image $I_H$ and to extract as inspection object information at least one (low luminance level image $I_L$ in FIG. 7) of the resultant luminance image components. The first operation step for detection is to subject the extracted inspection object information (low luminance level image $I_L$) to the morphology operation using the structuring element e (which is the same as the structuring element applied in the image processing method of the third application example). The generation step for detection is to perform component composition to combine the low level image $I_L$ as the detection object information (morphology image information obtained in the first operation step for detection) with the remaining luminance image components (high luminance level image $I_H$) except for the inspection object component out of the plurality of luminance image components resulting from the component decomposition in the extraction step for detection, to generate the digital image $I'_{ff}$ for inspection. The determination step is to detect whether the acquired digital image $I'_f$ is falsified or to specify a falsified portion therein, based on difference information between the digital image $I'_{ff}$ for inspection thus generated and the acquired digital image $I'_f$.

Figure 8:
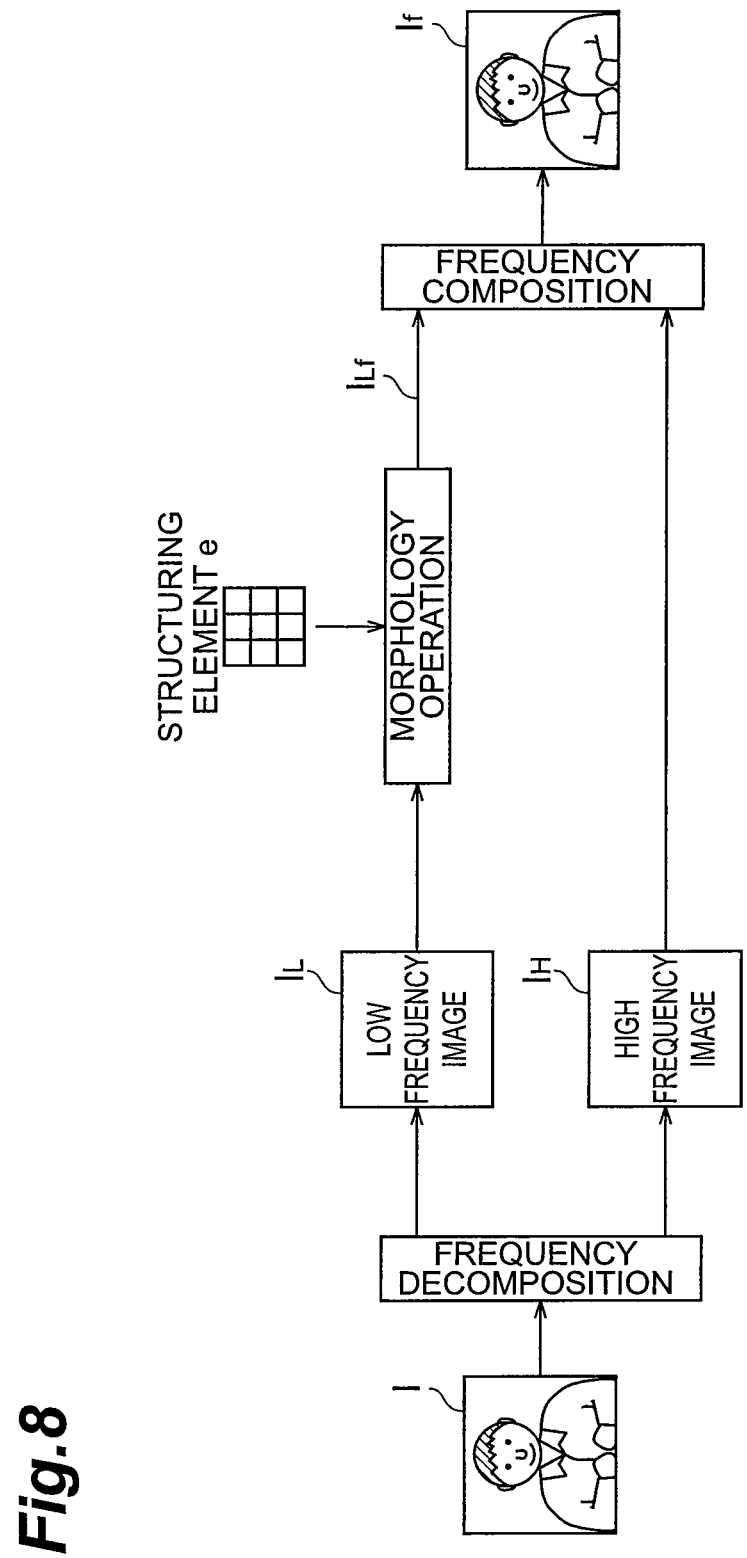
FIG. 8 is a conceptual diagram for explaining a fourth application example (frequency decomposition) of the image processing method according to the first embodiment.

Furthermore, FIG. 8 is a drawing for explaining the fourth application example (frequency decomposition) of the image processing method according to the first embodiment. In general, it is often the case that data compression and decompression are carried out in distribution or recording of a digital image. In this fourth application example, a digital image as an object is decomposed into a plurality of frequency image components and the morphology operation is restrictively carried out on a part thereof (one of the plurality of frequency image components resulting from the frequency decomposition). For this reason, compression resistance can be improved even in an existing data compression system such as the JPEG2000 system. The image processing method of the fourth application example also has an extraction step for processing, a first operation step for processing, and a generation step for processing.

In the image processing method of the fourth application example, the extraction step for processing is to extract as a processing object component at least one (low frequency image component $I_L$ in FIG. 8) out of a plurality of frequency image components (low frequency image component $I_L$ and high frequency image component $I_H$) resulting from frequency decomposition of the unprocessed digital image I. The first operation step for processing is to subject the extracted processing object component (low frequency image component $I_L$) to the morphology operation. The generation step for processing is to perform frequency composition to combine the processing object component (low frequency image component $I_L$) subjected to the morphology operation in the first operation step for processing with the remaining frequency image components (high frequency image component $I_H$) except for the processing object component out of the plurality of frequency image components resulting from the frequency decomposition in the extraction step for processing, to obtain the processed digital image $I_f$.

On the other hand, the falsification detection (image inspecting method of the fourth application example) corresponding to the image processing method of the fourth application example has an extraction step for detection, a first operation step for detection, a generation step for detection, and a determination step. The extraction step for detection is to perform frequency decomposition to decompose the digital image $I'_f$ (acquired digital image) acquired from the falsification-vulnerable environment 100, into low frequency image component $I_L$ and high frequency image component $I_H$ and to extract as inspection object information at least one (low frequency image component $I_L$ in FIG. 8) out of the plurality of frequency image components obtained. The first operation step for detection is to subject the extracted inspection object information (low frequency image component $I_L$) to the morphology operation using the structuring element e (which is the same as the structuring element applied in the image processing method of the fourth application example). The generation step for detection is to perform frequency composition to combine the low frequency image component $I_L$ as the detection object information (morphology image information obtained in the first operation step for detection) with the remaining frequency image components (high frequency image component $I_H$) except for the inspection object component out of the plurality of frequency image components resulting from the frequency decomposition in the extraction step for detection, to generate the digital image $I'_{ff}$ for inspection. The determination step is to detect whether the acquired digital image $I'_f$ is falsified or to specify a falsified portion therein, based on difference information between the digital image $I'_{ff}$ for inspection thus generated and the acquired digital image $I'_f$.

Figure 9:
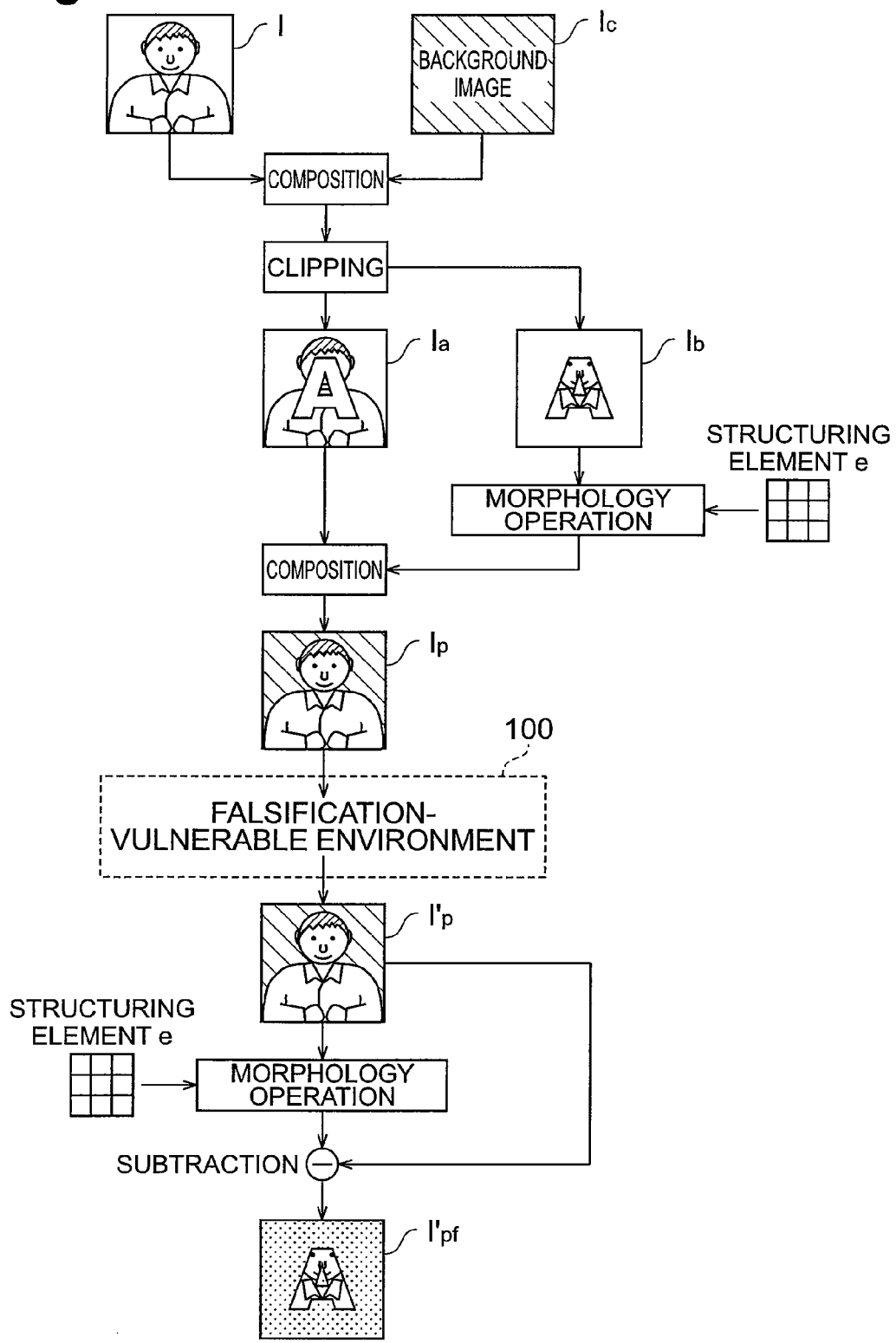
FIG. 9 is a conceptual diagram for explaining a fifth application example (image division) of the image processing method according to the first embodiment.

FIG. 9 is a drawing for explaining the fifth application example (image division) of the image processing method and image inspecting method according to the first embodiment. The "extraction" process in the present specification includes all of (1) a process to separate a part of a digital image as an object of the morphology operation therefrom (process of clipping a partial image from the digital image), (2) a process to copy each region in a digital image as a partial image becoming an object of the morphology operation (copying process), and (3) a process to specify each region in a digital image as an object region of the morphology operation (partial process of defining the digital image itself as an object of the morphology operation and subjecting each of specified regions partially to the morphology operation). An example of the "extraction" process will be described below as to the clipping process to extract an object (partial image) of the morphology operation from a digital image being an original image.

The image processing method and image inspecting method of the fifth application example are configured to perform the morphology operation on a part of a digital image clipped from the digital image being a processing object. For this reason, when one or more image patterns are extracted from the digital image being the processing object so that each has a specific shape like a character or the like and so that they constitute a visually significant character string or graphic, a mark, or the like, it becomes feasible to apply the methods to an electronic signature, copyright management information, and so on (or to embed significant information such as the copyright management information in the digital image). The image inspecting method of the fifth application example also makes use of the idempotent of morphology operation to readily read the information embedded in the digital image (and also to make it visually recognized).

The image processing method of the fifth application example has an extraction step for processing, a first operation step for processing, and a generation step for processing. Specifically, in the image processing method of the fifth application example, the extraction step for processing is first to perform a composition process to combine a digital image I with a background image $I_c$. In more detail, this composition process is implemented by superimposing the background image $I_c$ on the digital image I. The extraction step for processing is to clip a part from the superimposed image resulting from the composition process, as a processing object, to divide the superimposed image into image $I_a$ and image $I_b$. The extraction step for processing is to extract either of these images $I_a$ and $I_b$ (divided image $I_b$ in FIG. 9) as a processing object image. The first operation step for processing is to subject the divided image $I_b$ as a processing object image to the morphology operation using the structuring element e. The generation step for processing is to connect the divided image $I_b$ (morphology image information obtained in the first operation step for processing) as the processing object image to the remaining divided image $I_a$. In the case where a binarized image is subjected to the morphology operation and where the background is a single color (e.g., white), it is sometimes the case that the falsification detection capability and falsification position identification accuracy after the morphology operation are insufficient. In the fifth application example, therefore, in order to achieve further improvement in falsification detection capability and falsification position identification accuracy for the digital image I as a processing object, the background image $I_c$ is superimposed on the digital image I, thereby obtaining the superimposed image as a direct processing object (unprocessed digital image).

On the other hand, the falsification detection (image inspecting method of the fifth application example) corresponding to the image processing method of the fifth application example has an extraction step for detection, a first operation step for detection, a generation step for detection, and a determination step. The extraction step for detection is to extract the whole of a digital image $I'_P$ (acquired digital image) acquired from the falsification-vulnerable environment 100, as inspection object information. The first operation step for detection is to subject the extracted inspection object information (entire acquired digital image $I'_P$) to the morphology operation using the structuring element e (which is the same as the structuring element applied in the image processing method of the fifth application example). The generation step for detection is to generate a digital image $I'_{Pf}$ for inspection as difference information between the detection object information (morphology image information obtained in the first operation step for detection) and the acquired digital image $I'_P$. The determination step is to determine whether the acquired digital image $I'_{Pf}$ is falsified, based on the digital image $I'_{Pf}$ for inspection thus generated. Since the acquired digital image $I'_P$ being the inspection object information is composed of the divided image $I_b$ already subjected to the morphology operation and the rest divided image $I_a$, when the morphology operation is carried out on the entire acquired digital image $I'_P$ in falsification detection, the images before and after the morphology operation in the falsification detection must agree with each other unless the divided image $I_b$ is falsified. On the other hand, since the divided image $I_a$ is not subjected to the morphology operation in image processing, the images before and after the morphology operation in falsification detection must disagree with each other. Therefore, by calculating the difference between the detection object information (morphology image information obtained in the first operation step for detection) and the acquired digital image $I'_P$, we can obtain the digital image $I'_{Pf}$ for detection to provide a clear display of the divided image $I_b$. On the contrary, if the region corresponding to the divided image $I_b$ in the digital image $I'_{Pf}$ for detection is not displayed as a clear image, it becomes clear that the acquired digital image $I'_P$ is falsified.

The image processing method and image inspecting method of the fifth application example permit specific information (significant character pattern string or graphic subjected to the morphology operation) to be embedded as the divided image $I_b$ in the processed digital image $I_P$. Specifically, a part of the unprocessed digital image I is clipped so as to form a significant character string, graphic, or the like from the unprocessed digital image I and the clipped divided image $I_b$ is subjected to the morphology operation; therefore, the methods can also be applied as a technology replacing the conventional electronic watermark technology, to an electronic signature system.

Next, the second embodiment of the image processing method and image inspecting method according to the present invention will be described with reference to FIGS. 10 to 13. In this second embodiment, the "extraction" process with the processing object image includes all of (1) the clipping process, (2) the copying process, and (3) the partial process as described above. There are no restrictions on the number of morphology operations on the extracted processing object image. Furthermore, the type of the morphology operation, the shape and size of the structuring element, the bit-plane depth to which the morphology operation is applied, and the image region to which the morphology operation is applied are properly adjusted in order to achieve desired image quality, falsification detection capability, and falsification position identification accuracy.

Figure 10:
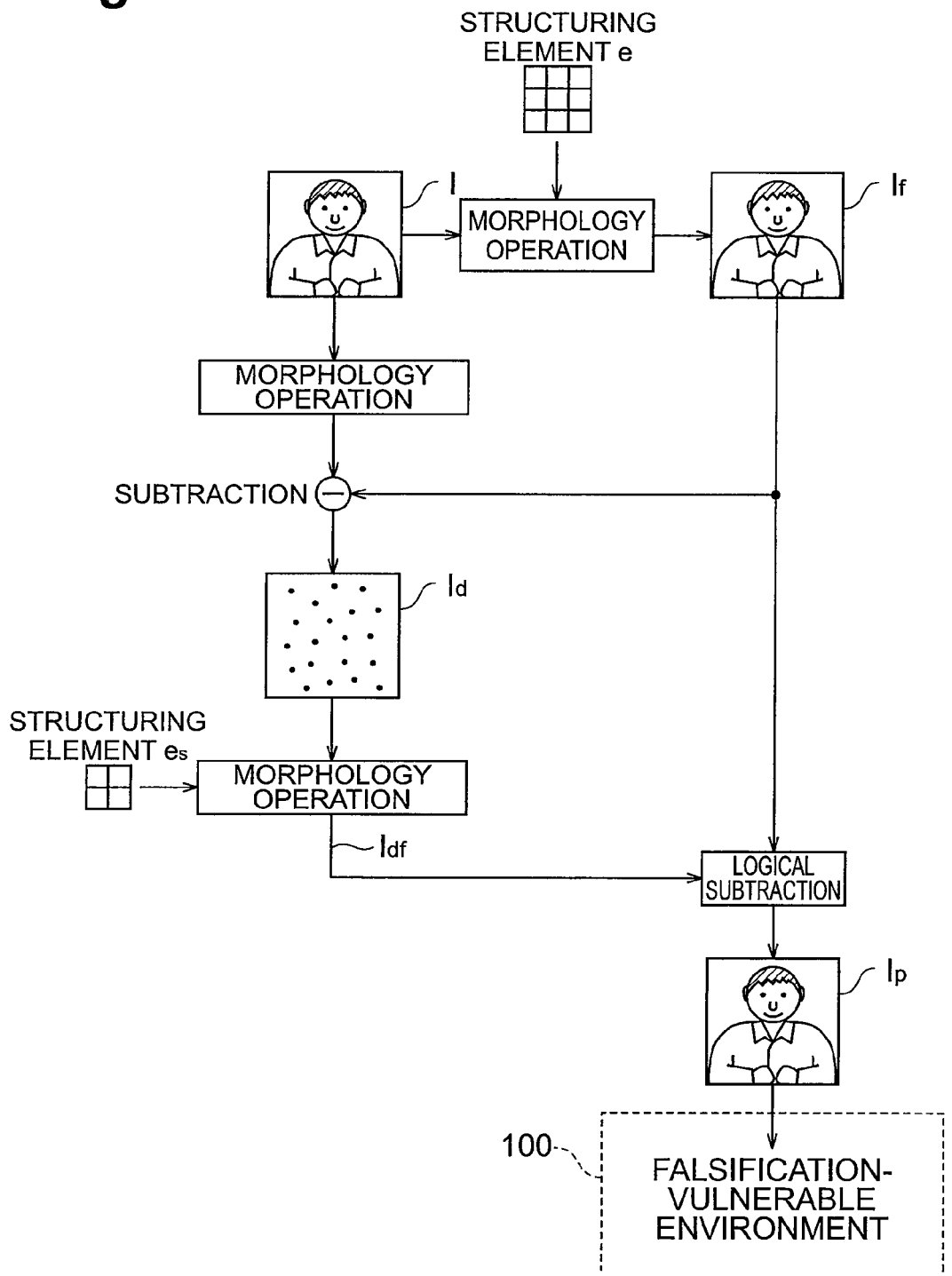
FIG. 10 is a conceptual diagram for explaining the second embodiment of the image processing method according to the present invention.

FIG. 10 is a conceptual diagram for explaining the second embodiment of the image processing method according to the present invention. In the image processing method of the first embodiment described above, if the structuring element e applied to the morphology operation is too large, the image $I_f$ after the operation will fail to adequately preserve the details of the original image I. In this case, the image quality of the image $I_f$ after the morphology operation in the first operation step for processing can degrade significantly. Therefore, the image processing method of the second embodiment further comprises a second operation step for processing to subject difference information $I_d$ between the processing object information (original image information of unprocessed digital image I) extracted in the extraction step for processing and the morphology image information $I_f$ obtained in the first operation step for processing, to a morphology operation using a second structuring element $e_S$ ($e_S \subset e$: structuring element forming a part of the structuring element e and being smaller than the structuring element e) different from the structuring element e. In this case, the generation step for processing is to generate a processed digital image $I_P$ by a logical subtraction operation (described below) between the morphology image information $I_f$ obtained in the first operation step for processing and morphology difference information $I_{df}$ obtained in the second operation step for processing.

Namely, the image processing method according to the second embodiment has an extraction step for processing, a first operation step for processing, a second operation step for processing, and a generation step for processing. In the image processing method according to the second embodiment, the extraction step for processing is to extract the whole of the digital image I being a processing object, as processing object information. The first operation step for processing is to subject the extracted processing object information (the whole of the unprocessed digital image I) to the morphology operation using the structuring element e. On the other hand, the second operation step for processing is to subject difference information $I_d$ (=|I−$I_f$|: absolute difference) between the unprocessed digital image I and the morphology image information $I_f$ obtained in the first operation step for processing, to the morphology operation using the structuring element $e_S$ ($e_S \subset e$) different from the structuring element e. The generation step for processing is to perform a logical subtraction operation between the morphology image information $I_f$ obtained in the first operation step for processing and the morphology difference information $I_{df}$ obtained in the second operation step for processing, to obtain a processed digital image $I_P$. When the morphology operations in the first and second operation steps for processing are opening, the logical subtraction operation ($I_f+I_{df}$) provides the difference image $I_P$. On the other hand, when the morphology operations in the first and second operation steps for processing are closing, the logical subtraction operation ($I_f−I_{df}$) provides the difference image $I_P$.

Figure 11:
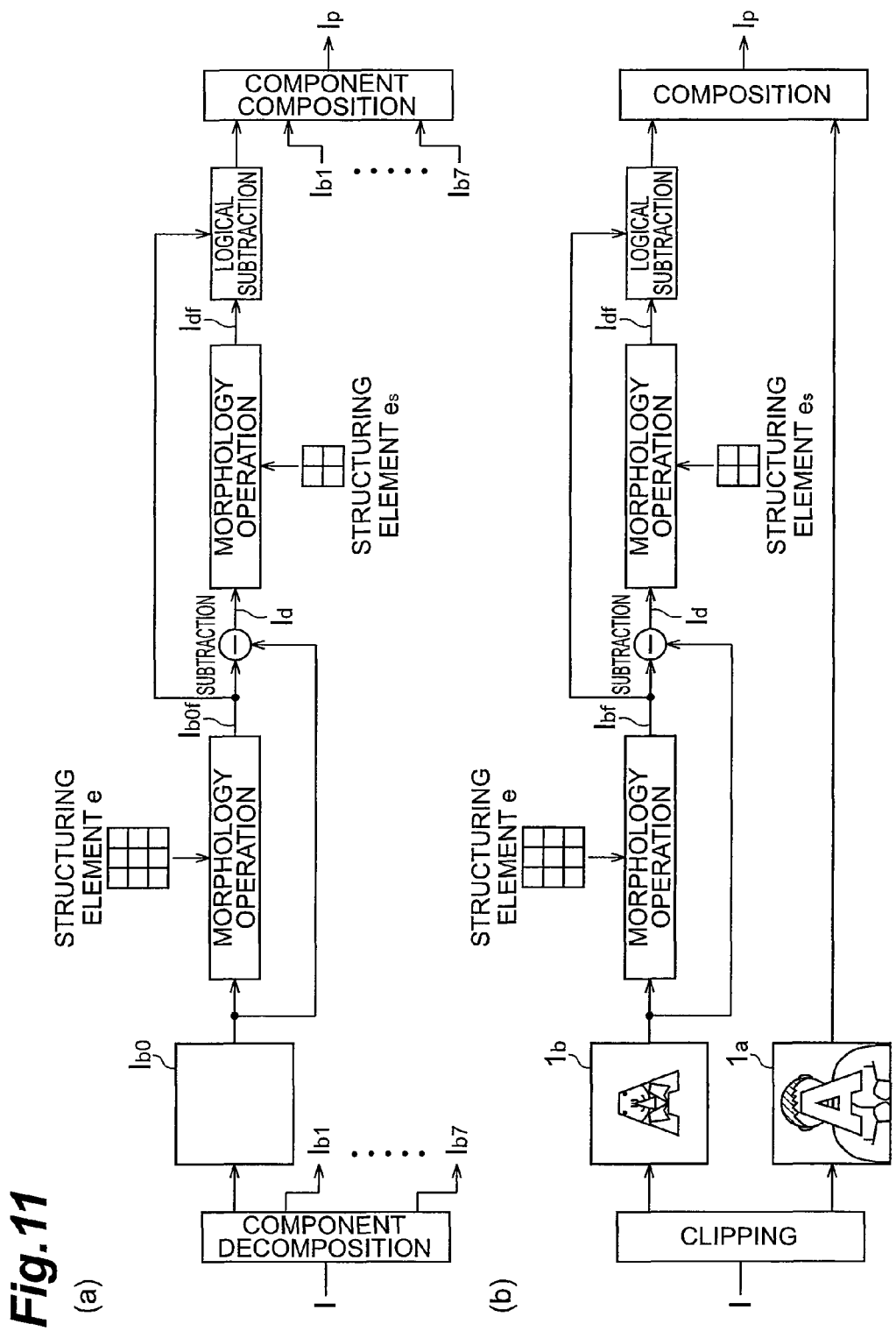
FIG. 11 is a conceptual diagram for explaining an application example of the image processing method according to the second embodiment.

The image processing method according to the second embodiment described above is configured to subject the whole of the unprocessed digital image I (original image information) to the morphology operation, but it is also possible to subject one component (frequency component, color component, luminance component, or bit plane) of the unprocessed digital image I or a partial divided image clipped from the unprocessed digital image I, to the morphology operation. FIG. 11 is a drawing for explaining application examples of the image processing method according to the second embodiment.

First, the image processing method of the first application example shown in the area (a) of FIG. 11 has an extraction step for processing, a first operation step for processing, a second operation step for processing, and a generation step for processing as described above. For example, the area (a) of FIG. 11 shows a configuration wherein the processing object information is one of bit planes among the components of the unprocessed digital image I. Specifically, in the image processing method of the first application example, the extraction step for processing is to perform bit component decomposition of the unprocessed digital image I to obtain a bit plane $I_{b0}$ composed of the first bits of the respective pixels $P_{11}, P_{12}, \ldots, P_{nm}$, a bit plane $I_{b1}$ composed of the second bits of the respective pixels $P_{11}, P_{12}, \ldots, P_{nm}, \ldots$, and a bit plane $I_{b7}$ composed of the eighth bits of the respective pixels $P_{11}, P_{12}, \ldots, P_{nm}$, and to extract one of these bit planes (bit plane $I_{b0}$ in the area (a) of FIG. 11) as a processing object plane. The first operation step for processing is to subject the extracted processing object plane $I_{b0}$ to the morphology operation using the structuring element e. On the other hand, the second operation step for processing is to subject difference information ($=|I_{b0}-I_{b0f}|$) between the processing object plane $I_{b0}$ and the morphology image information $I_{b0f}$ obtained in the first operation step for processing, to the morphology operation using the structuring element $e_S$ ($e_S \subset e$) different from the structuring element e. The generation step for processing is then to perform bit component composition to combine the difference information between the morphology image information $I_{b0f}$ obtained in the first operation step for processing and the morphology difference information $I_{df}$ obtained in the second operation step for processing, with the remaining bit planes $I_{b1}$-$I_{b7}$, thereby generating the processed digital image $I_P$. The configuration to apply the morphology operation to one of the aforementioned image components is also applicable to one of the frequency components, color components, and luminance components of the unprocessed digital image I.

As shown in the area (b) of FIG. 11, the image processing method according to the second embodiment is also applicable to a processing object of a divided image clipped from the unprocessed digital image I. The image processing method of the second application example shown in the area (b) of FIG. 11 has an extraction step for processing, a first operation step for processing, a second operation step for processing, and a generation step for processing. In this case, the object region of the morphology operation can be limited to a region of the unprocessed digital image, which can considerably reduce a processing load of the image processing method.

In the image processing method of the second application example, the extraction step for processing is to divide the unprocessed digital image I into image $I_a$ and image $I_b$ and to extract the divided image $I_b$ as a processing object image. The first operation step for processing is to subject the divided image $I_b$ to the morphology operation using the structuring element e. On the other hand, the second operation step for processing is to subject difference information $I_d$ ($=|I_b-I_{bf}|$) between the divided image $I_b$ and the morphology image information $I_{bf}$ obtained in the first operation step for processing, to the morphology operation using the structuring element $e_S$ ($e_S \subset e$) different from the structuring element e. The generation step for processing is to connect a difference image between the morphology image information $I_{bf}$ obtained in the first operation step for processing and the morphology difference information $I_{df}$ obtained in the second operation step for processing, to the remaining divided image $I_a$, thereby generating the processed digital image $I_P$.

Figure 12:
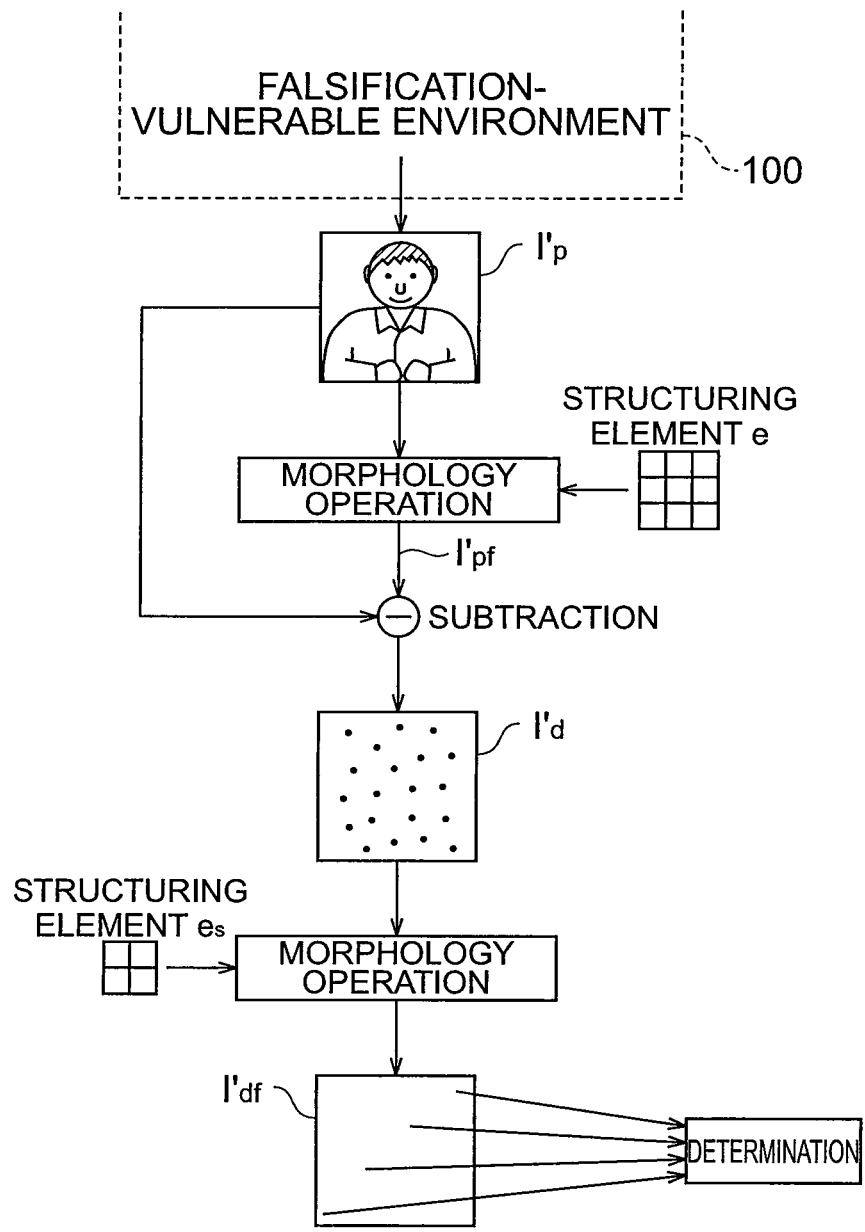
FIG. 12 is a conceptual diagram for explaining the second embodiment of the image inspecting method according to the present invention.

The following will describe the second embodiment of the image inspecting method according to the present invention. FIG. 12 is a conceptual diagram for explaining the second embodiment of the image inspecting method according to the present invention. The image inspecting method according to the second embodiment has an extraction step for detection, a first operation step for detection, a second operation step for detection, and a determination step. Since in the image inspecting method of the second embodiment the morphology difference information finally obtained is the determination data for detection of falsification, it is unnecessary to perform the generation step for detection as in the first embodiment. Without falsification, all the pixel values of the extracted difference information must be zero because of the idempotent of morphology operation and in this case, the determination step results in determining that the acquired digital image is not falsified. On the contrary, if there is a pixel with a nonzero value, a position of the pixel with the nonzero value is detected as a falsification position.

In the image inspecting method of the second embodiment, the extraction step for detection is to extract the whole of the acquired digital image $I'_P$ acquired from the falsification-vulnerable environment 100, as inspection object information. The first operation step for detection is to subject the extracted inspection object information to the morphology operation using the structuring element e. The second operation step for detection is to subject difference information $I'_d$ ($=|I'_P-I'_{Pf}|$) between the acquired digital image $I'_P$ and the morphology image information $I'_{Pf}$ obtained in the first operation step for detection, to the morphology operation using the structuring element $e_S$ ($e_S \subset e$) different from the structuring element e, thereby finally obtaining morphology difference information $I'_{df}$. The determination step is to determine whether the acquired digital image is falsified, based on the morphology difference information $I'_{df}$ thus obtained. If the acquired digital image $I'_P$ is not falsified, values of the respective pixels forming the morphology difference information $I'_{df}$ finally obtained should be zero. On the contrary, if there is a pixel with a nonzero value, a position of the pixel with the nonzero value is detected as a falsification position.

Figure 13:
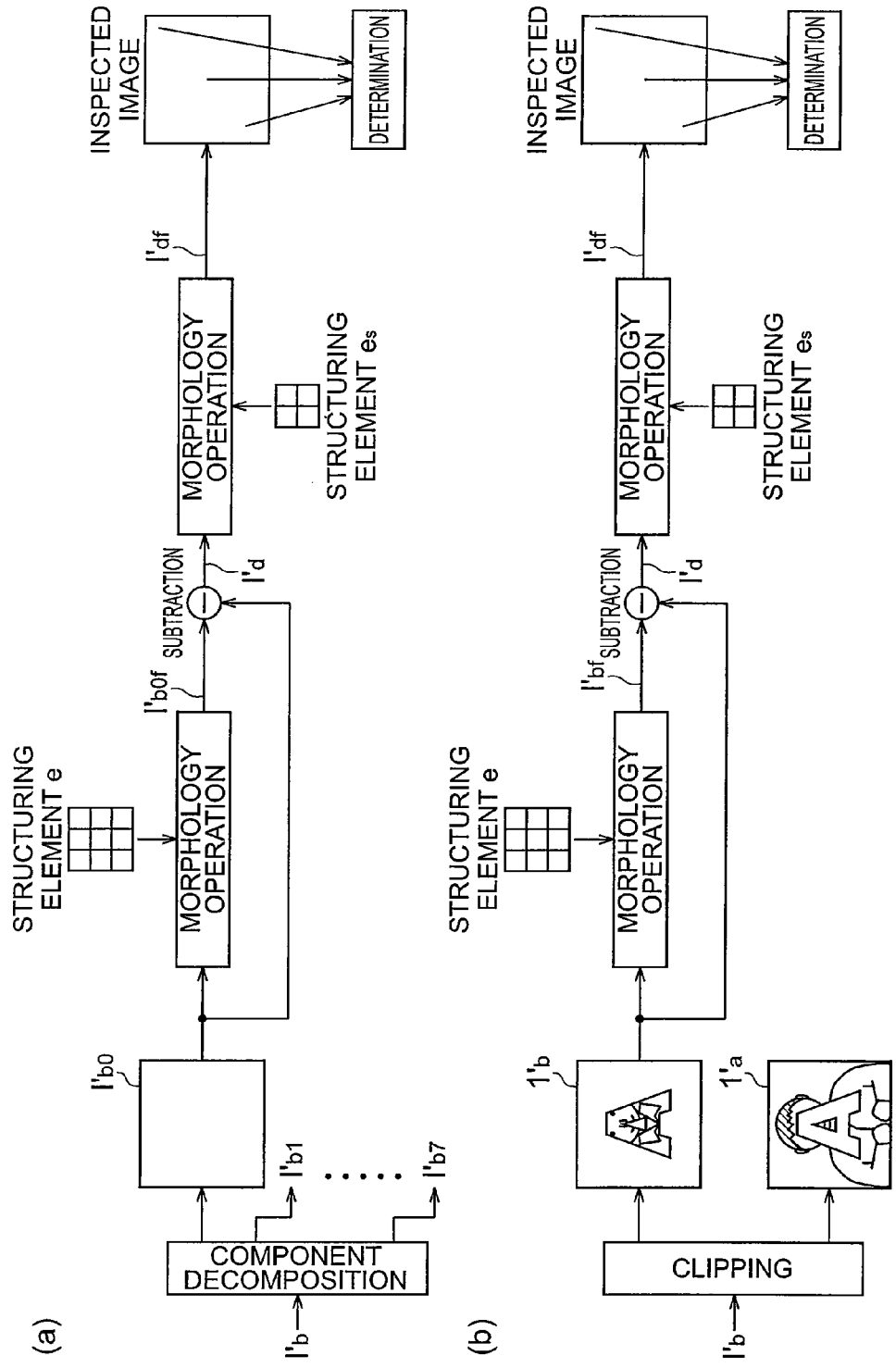
FIG. 13 is a conceptual diagram for explaining an application example of the image inspecting method according to the second embodiment.

The image inspecting method of the second embodiment described above is also configured to perform the morphology operation on the whole of the acquired digital image $I'_P$, but it is also possible to subject a component (frequency component, color component, luminance component, or bit plane) of the unprocessed digital image I or a partial divided image clipped from the unprocessed digital image I, to the morphology operation. FIG. 13 is a drawing for explaining application examples of the image inspecting method of the second embodiment.

First, the image inspecting method of the first application example shown in the area (a) of FIG. 13 has an extraction step for detection, a first operation step for detection, a second operation step for detection, and a determination step. For example, the area (a) of FIG. 13 shows a configuration in which the processing object information is one of bit planes among the components of the acquired digital image $I'_P$.

Specifically, in the image inspecting method of the first application example, the extraction step for detection is to perform bit component decomposition of the acquired digital image I'p to obtain a bit plane I'$_{b0}$ composed of the first bits of the respective pixels P$_{11}$, P$_{12}$, . . . , P$_{nm}$, a bit plane I'$_{b1}$ composed of the second bits of the respective pixels P$_{11}$, P$_{12}$, . . . , P$_{nm}$, . . . , and a bit plane I'$_{b7}$ composed of the eighth bits of the respective pixels P$_{11}$, P$_{12}$, . . . , P$_{nm}$, and to extract one of these bit planes (bit plane I'$_{b0}$ in the area (a) of FIG. 13) as a detection object plane. The first operation step for detection is to subject the extracted detection object plane I'$_{b0}$ to the morphology operation using the structuring element e. On the other hand, the second operation step for detection is to subject difference information (=|I'$_{b0}$−I'$_{b0f}$|) between the detection object plane I'$_{b0}$ and the morphology image information I'$_{b0f}$ obtained in the first operation step for detection, to the morphology operation using the structuring element e$_S$ (e$_S$ ⊂ e) different from the structuring element e. Then the determination step is to determine whether the acquired digital image is falsified, based on the morphology difference information I'$_{df}$ obtained in the second operation step for detection. If the acquired digital image I'$_P$ is not falsified, values of the respective pixels forming the morphology difference information I'$_{df}$ finally obtained must be zero. On the contrary, if there is a pixel with a nonzero value, a position of the pixel with the nonzero value is detected as a falsification position. The configuration wherein the morphology operation is applied to one of the aforementioned image components is also applicable to any one of the frequency components, color components, and luminance components of the acquired digital image I'$_P$.

As shown in the area (b) of FIG. 13, the image inspecting method of the second embodiment is also applicable to a detection object of a divided image clipped from the acquired digital image I'$_P$. This image inspecting method of the second application example shown in the area (b) of FIG. 13 has an extraction step for detection, a first operation step for detection, a second operation step for detection, and a determination step. In this case, the object region of the morphology operation can be limited to a region of the acquired digital image, and it is thus feasible to considerably reduce a processing load of the image inspecting method.

In the image inspecting method of the second application example, the extraction step for detection is to divide the acquired digital image I'$_P$ into image P$_a$ and image P$_b$ and to extract the divided image P$_b$ as a detection object image. The first operation step for detection is to subject the divided image I'$_b$ to the morphology operation using the structuring element e. On the other hand, the second operation step for detection is to subject difference information I'$_d$ (=|I'$_b$−I'$_{bf}$|) between the divided image I'$_b$ and the morphology image information I'$_{bf}$ obtained in the first operation step for detection, to the morphology operation using the structuring element e$_S$ (e$_S$ ⊂ e) different from the structuring element e. In the falsification detection process according to the second application example, the determination step is also to determine whether the acquired digital image is falsified, based on the morphology difference information I'$_{df}$ obtained in the second operation step for detection. If the acquired digital image I'$_P$ is not falsified, values of the respective pixels forming the morphology difference information I'$_{df}$ finally obtained must be zero. On the contrary, if there is a pixel with a nonzero value, a position of the pixel with the nonzero value is detected as a falsification position.

The image processing methods and image inspecting methods as described above may be a program executed in a computer or the like and in this case, the program may be distributed through a wired or wireless network, or may be stored in a recording medium such as a CD, DVD, or flash memory managed in the server or terminal device.

The image processing methods and image inspecting methods according to the present invention are applicable to systems for transmitting and receiving digital contents through network 101, particularly, digital images such as still pictures (including binarized images such as imaged documents) and image frames forming a dynamic picture. In such systems, the image processing methods and image inspecting methods are also effective as means for transmitting and receiving information being at least either of information inherent to a data transmitter and information inherent to a data receiver. It is a matter of course that image data stored in the recording device 102 is also an object.

The shape and size of the structuring element used in the morphology operation f can be optionally altered, and the information about the structuring element is shared by the side to execute the image processing method and the side to execute the image inspecting method.

The image processing methods and image inspecting methods according to the present invention also realize an electronic signature function to embed specific information in a digital data in a system in which the data transmission side and the date reception side share the digital image or mutually transmit and receive the digital image.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

INDUSTRIAL APPLICABILITY

The present invention realizes the proof of authenticity of digital contents distributed to the recording apparatus and through the networks more efficiently (at a higher speed and with a lower processing load) and is expected to be effective to prevention of falsification; therefore, the present invention is applicable to a broad range of information security technology. As an example, the present invention makes it feasible to detect whether a digital image is falsified, to process a digital image so as to enable identification of a falsified portion, to embed right management information such as a notice of copyright as an electronic watermark in a digital image, and to extract an embedded electronic watermark from the digital image.

The invention claimed is:

1. An image processing method of processing a digital data as an object, which can exist temporarily or continuously in a falsification-vulnerable environment, so as to enable proof of authenticity thereof, the image processing method comprising:
 a first extraction step of extracting from an unprocessed digital image, at least a part of the unprocessed digital image as processing object information;
 a first operation step of subjecting the processing object information to a first morphology operation using a predetermined first structuring element, to obtain first morphology image information;
 a first generation step of generating a processed digital image containing the first morphology image information; and
 a second operation step of subjecting difference information between the processing object information and the first morphology image information to a second morphology operation using a second structuring element different from the first structuring element, to obtain first morphology difference information,
wherein the first generation step performs a logical subtraction operation between the first morphology image information and the first morphology difference information to generate the processed digital image.

2. An image processing method according to claim 1, wherein the first extraction step extracts, as a processing object component, at least one of a plurality of image components resulting from component decomposition of the unprocessed digital image, as to one of frequency components, color components, luminance components, and bit planes of the unprocessed digital image,
wherein the first operation step subjects the processing object component to the first morphology operation to obtain the first morphology image information, and
wherein the second operation step subjects difference information between the processing object component and the first morphology image information to a second morphology operation using a second structuring element different from the first structuring element, to obtain the first morphology difference information.

3. An image inspecting method of implementing inspection of authenticity of a digital image, which is acquired from a falsification-vulnerable environment and has been subjected to processing for proof of authenticity by the image processing method according to claim 2, the image inspecting method comprising:
a second extraction step of extracting as inspection object information at least one of a plurality of image components resulting from component decomposition of the acquired digital image, as to any one of frequency components, color components, luminance components, and bit planes of the acquired digital image;
a third operation step of subjecting the inspection object information to a third morphology operation using a third structuring element which is the same as the first structuring element, to obtain second morphology image information;
a fourth operation step of subjecting difference information between the inspection object information and the second morphology image information to a fourth morphology operation using a fourth structuring element which is the same as the second structuring element, to obtain second morphology difference information; and
a determination step of determining authenticity of the acquired digital image, based on the second morphology difference information.

4. An image processing method according to claim 1, wherein the first extraction step extracts, as a processing object image, one or more clipped images of a specific shape each of which is clipped from the unprocessed digital image and each of which forms a part of the unprocessed digital image,
wherein the first operation step subjects the processing object image to the first morphology operation to obtain the first morphology image information, and
wherein the second operation step subjects difference information between the processing object image and the first morphology image information to a second morphology operation using a second structuring element different from the first structuring element, to obtain the first morphology difference information.

5. An image inspecting method of implementing inspection of authenticity of a digital image, which is acquired from a falsification-vulnerable environment and has been subjected to processing for proof of authenticity by the image processing method according to claim 4, the image inspecting method comprising:
a second extraction step of extracting as an inspection object image one or more clipped images of a specific shape each of which is clipped from an acquired digital image and each of which forms a part of the acquired digital image;
a third operation step of subjecting the inspection object image to a third morphology operation using a third structuring element which is the same as the first structuring element, to obtain second morphology image information;
a fourth operation step of subjecting difference information between the inspection object information and the second morphology image information to a fourth morphology operation using a fourth structuring element which is the same as the second structuring element, to obtain second morphology difference information; and
a determination step of determining authenticity of the acquired digital image, based on the second morphology difference information.

6. An image inspecting method of implementing inspection of authenticity of a digital image, which is acquired from a falsification-vulnerable environment and has been subjected to processing for proof of authenticity by the image processing method according to claim 1, the image inspecting method comprising:
a second extraction step of extracting from the acquired digital image, at least a part of the acquired digital image as inspection object information;
a third operation step of subjecting the inspection object information to a third morphology operation using a third structuring element which is the same as the first structuring element, to obtain second morphology image information;
a fourth operation step of subjecting difference information between the inspection object information and the second morphology image information to a fourth morphology operation using a fourth structuring element which is the same as the second structuring element, to obtain second morphology difference information; and
a determination step of determining authenticity of the acquired digital image, based on the second morphology difference information.

7. An image inspecting method of implementing inspection of authenticity of a digital image, which is acquired from a falsification-vulnerable environment and has been subjected to processing for proof of authenticity by an image processing method of processing a digital data as an object, which can exist temporarily or continuously in a falsification-vulnerable environment, so as to enable proof of authenticity thereof, the image processing method comprising:
a first extraction step extracting from an unprocessed digital image, at least a part of the unprocessed digital image as processing object information;
a first operation step of subjecting the processing object information to a first morphology operation using a predetermined first structuring element, to obtain first morphology image information; and
a first generation step of generating a processed digital image containing the first morphology image information,
the image inspecting method comprising:
a second extraction step of extracting from the acquired digital image, at least a part of the acquired digital image as inspection object information;

a second operation step of subjecting the inspection object information to a second morphology operation using a second structuring element which is the same as the first structuring element, to obtain second morphology image information;

a second generation step of generating a digital image for inspection containing the second morphology image information; and a determination step of determining authenticity of the acquired digital image, based on difference information between the digital image for inspection and the acquired digital image.

8. An image inspecting method of implementing inspection of authenticity of a digital image, which is acquired from a falsification-vulnerable environment and has been subjected to processing for proof of authenticity by the image processing method of processing a digital data as an object, which can exist temporarily or continuously in a falsification-vulnerable environment, so as to enable proof of authenticity thereof, the image processing method comprising:

a first extraction step of extracting from an unprocessed digital image, at least a part of the unprocessed digital image as processing object information;

a first operation step of subjecting the processing object information to a first morphology operation using a predetermined first structuring element, to obtain first morphology image information, a first generation step of generating a processed digital image containing the first morphology image information, wherein the first extraction step extracts, as a processing object component, at least one of a plurality of image components resulting from component decomposition of the unprocessed digital image, as to one of frequency components, color components, luminance components, and bit planes of the unprocessed digital image, wherein the first operation step subjects the processing object component to the first morphology operation to obtain the first morphology image information, wherein the first generation step performs component composition to combine the first morphology image information with the remaining image components except for the processing object component out of the plurality of image components, and the image inspecting method comprising:

a second extraction step of extracting as inspection object information at least one of a plurality of image components resulting from component decomposition of the acquired digital image, as to any one of frequency components, color components, luminance components, and bit planes of the acquired digital image;

a second operation step of subjecting the inspection object information to a second morphology operation using a second structuring element which is the same as the first structuring element, to obtain second morphology image information;

a second generation step of performing component composition to combine the second morphology image information with the remaining image components except for the inspection object component out of the plurality of image components, to generate a digital image for inspection; and a determination step of determining authenticity of the acquired digital image, based on difference information between the digital image for inspection and the acquired digital image.

9. An image inspecting method of implementing inspection of authenticity of a digital image, which is acquired from a falsification-vulnerable environment and has been subjected to processing for proof of authenticity by the image processing method of processing a digital data as an object, which can exist temporarily or continuously in a falsification-vulnerable environment, so as to enable proof of authenticity thereof, the image processing method comprising:

a first extraction step of extracting from an unprocessed digital image, at least a part of the unprocessed digital image as processing object information;

a first operation step of subjecting the processing object information to a first morphology operation using a predetermined first structuring element, to obtain first morphology image information; and a first generation step of generating a processed digital image containing the first morphology image information;

wherein the first extraction step extracts, as a processed digital image containing the first morphology image information, wherein the first extraction step extracts, as a processing object image, one or more partial images of a specific shape of each of which forms a part of the digital image, from the unprocessed digital image, wherein the first operation step subjects the processing object image to the first morphology operation to obtain the first morphology image information, wherein the first generation step changes image information of a region corresponding to the processing object image, in the unprocessed digital image, so as to contain the first morphology image information, and the image inspecting method comprising:

a second extraction step of extracting a whole of the acquired digital image as an inspection object image;

a second operation step of subjecting the inspection object image to a second morphology operation using a second structuring element which is the same as the first structuring element, to obtain second morphology image information;

a second generation step of generating a difference image between the second morphology image information and the acquired digital image, as a digital image for inspection; and a determination step of determining authenticity of the acquired digital image, based on the digital image for inspection generated.

* * * * *